(12) United States Patent
Bai

(10) Patent No.: US 7,792,433 B2
(45) Date of Patent: *Sep. 7, 2010

(54) SYSTEM AND METHOD FOR GENERATING OPTICAL RETURN-TO-ZERO SIGNALS WITH DIFFERENTIAL BI-PHASE SHIFT AND FREQUENCY CHIRP

(75) Inventor: Yu Sheng Bai, Los Altos Hills, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1041 days.

This patent is subject to a terminal disclaimer.

(21) Appl. No.: 11/373,845

(22) Filed: Mar. 10, 2006

(65) Prior Publication Data

US 2007/0042735 A1 Feb. 22, 2007

Related U.S. Application Data

(60) Provisional application No. 60/710,668, filed on Aug. 22, 2005.

(51) Int. Cl.
H04B 10/04 (2006.01)

(52) U.S. Cl. .................. 398/183; 398/186; 398/188; 398/193

(58) Field of Classification Search .................. 398/182, 398/183, 185, 186, 187, 188, 189, 190, 191, 398/192, 193, 194, 199, 200, 201, 158, 159, 398/161, 81, 102
See application file for complete search history.

(56) References Cited

U.S. PATENT DOCUMENTS

| | | | |
|---|---|---|---|
| 5,625,722 A | 4/1997 | Froberg et al. | |
| 5,917,638 A | 6/1999 | Franck et al. | |
| 6,188,497 B1* | 2/2001 | Franck et al. | ............... 398/183 |
| 6,535,316 B1 | 3/2003 | Mizuhara | |
| 6,542,280 B2 | 4/2003 | Walklin | |
| 6,623,188 B1 | 9/2003 | Dimmick et al. | |
| 6,865,348 B2* | 3/2005 | Miyamoto et al. | .......... 398/183 |
| 6,876,818 B1 | 4/2005 | Bai et al. | |
| 2003/0218790 A1 | 11/2003 | Mikkelsen | |
| 2004/0109698 A1* | 6/2004 | Kim et al. | ................... 398/199 |
| 2004/0165893 A1 | 8/2004 | Winzer | |
| 2006/0193228 A1* | 8/2006 | Bai | ......................... 369/59.23 |
| 2006/0193230 A1* | 8/2006 | Bai | ......................... 369/59.23 |
| 2007/0116476 A1* | 5/2007 | Bai | ............................. 398/183 |

FOREIGN PATENT DOCUMENTS

| | | |
|---|---|---|
| CN | 1503500 | 6/2004 |
| CN | 1507178 | 6/2004 |
| CN | 1512686 | 7/2004 |

OTHER PUBLICATIONS

Forzati et al., "Reduction of intrachannel four-wave mixing using the alternate-phase RZ modulation format", *IEEE Photonics Technology Letters*, (Sep. 2002), 14(9):1285-1287.

(Continued)

Primary Examiner—Hanh Phan

(57) ABSTRACT

A system and method for generating an optical return-to-zero signal. The system includes an electro-optical conversion system. The electro-optical conversion system is configured to receive an input electrical non-return-to-zero signal, process information associated with the input electrical non-return-to-zero signal, and generate an output optical return-to-zero signal based on at least information associated with the input electrical non-return-to-zero signal. The output optical return-to-zero signal is an optical differential return-to-zero signal, and the optical differential return-to-zero signal is associated with a frequency chirp.

24 Claims, 13 Drawing Sheets

OTHER PUBLICATIONS

Kaiser et al., "Reduced complexity optical duobinary 10-Gb/s transmitter setupresulting in an increased transmission distance," *IEEE Photonics Technology Letters*, (2001), 13(8):884-886.

Miyamoto et al., "320 Gbit/s (8×40 Gbit/s) WDM transmission over 367 km with 120 km repeater spacing using carrier-suppressed return-to-zero format," *Electronics Letters*, (Nov. 11, 1999), 35(23):2041-2042.

* cited by examiner under the page number.

SYSTEM AND METHOD FOR GENERATING OPTICAL RETURN-TO-ZERO SIGNALS WITH DIFFERENTIAL BI-PHASE SHIFT AND FREQUENCY CHIRP

CROSS-REFERENCES TO RELATED APPLICATIONS

This application claims priority to U.S. Provisional Application No. 60/710,668, filed Aug. 22, 2005, which is incorporated by reference herein.

The following three commonly-owned co-pending applications are hereby incorporated by reference in their entirety for all purposes:

1. U.S. patent application Ser. No. 11/336,658, in the name of Yu Sheng Bai, titled, "System and Method for Generating Optical Return-to-Zero Signals with Alternating Bi-Phase Shift,", filed Jan. 20, 2006;

2. U.S. patent application Ser. No. 11/336,619, in the name of Yu Sheng Bai, titled, "System and Method for Generating Optical Return-to-Zero Signals with Alternating Bi-Phase Shift and Frequency Chirp,", filed Jan. 20, 2006; and 3. U.S. patent application Ser. No. 11/344,958, in the name of Yu Sheng Bai, titled, "System and Method for Generating Optical Return-to-Zero Signals with Differential Bi-Phase Shift,", filed Jan. 31, 2006.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates in general to telecommunication techniques. More particularly, the invention provides a system and method for generating optical return-to-zero signals with differential bi-phase shift and frequency chirp. Merely by way of example, the invention is described as it applies to optical networks, but it should be recognized that the invention has a broader range of applicability.

Telecommunication techniques have progressed through the years. As merely an example, optical networks have been used for conventional telecommunications in voice and other applications. The optical networks can transmit multiple signals of different capacities. For example, the optical networks terminate signals, multiplex signals from a lower speed to a higher speed, switch signals, and transport signals in the networks according to certain definitions.

In optical communications, an optical signal may transmit a long distance, such as hundreds or even thousands of kilometers, in optical fiber links. The quality of received signals often can be improved by using return-to-zero (RZ) modulations instead of non-return-to-zero (NRZ) modulations. For example, a signal under return-to-zero modulation includes logic low and high states, such as ones represented by "0" and "1" respectively. The signal state often is determined by the voltage during one part of a bit period, and the signal returns to a resting state during another part of the bit period. As an example, the resting state is represented by zero volt. In another example, a signal under non-return-to-zero modulation includes logic low and high states, such as ones represented by "0" and "1" respectively. The signal state often is determined by the voltage during a bit period without the signal returning to a resting state during at least a part of the bit period.

The return-to-zero modulations usually can provide better resistance to signal noises than the non-return-to-zero modulations. Additionally, the isolated RZ pulses often experience nearly identical nonlinear distortions during transmission, which can be at least partially mitigated through proper dispersion compensation schemes. Hence RZ signals usually are more resistant to nonlinear distortions than NRZ signals.

Among complex RZ signals, the optical carrier-suppressed return-to-zero (CSRZ) signals can provide strong transmission capabilities. For example, the CSRZ signals have alternating bi-phase shifts between adjacent bits, and are less affected by inter-symbol interference than the simple RZ signals, which often are intensity modulated without phase modulation. Thus the CSRZ signals are more tolerant for both dispersions and nonlinear distortions.

FIG. 1 is a simplified conventional system for generating CSRZ signals. The system 100 includes an NRZ source 110, an NRZ data driver 120, a CW diode laser 130, a data modulator 140, a clock driver 150, a phase shifter 155, and a clock modulator 160. The data modulator 140 and the clock modulator 160 each are an EO modulator. The EO modulator 160 is biased at null and driven by a half-rate data clock signal generated by the clock driver 150. In response, the EO modulator 160 can generate optical clock pulses. As shown in FIG. 1, the conventional system 100 for generating CSRZ signals often is complex and expensive.

Hence it is highly desirable to improve techniques for generating return-to-zero signals.

BRIEF SUMMARY OF THE INVENTION

The present invention relates in general to telecommunication techniques. More particularly, the invention provides a system and method for generating optical return-to-zero signals with differential bi-phase shift and frequency chirp. Merely by way of example, the invention is described as it applies to optical networks, but it should be recognized that the invention has a broader range of applicability.

According to one embodiment of the present invention, a system for generating an optical return-to-zero signal includes an electro-optical conversion system. The electro-optical conversion system is configured to receive an input electrical non-return-to-zero signal, process information associated with the input electrical non-return-to-zero signal, and generate an output optical return-to-zero signal based on at least information associated with the input electrical non-return-to-zero signal. The output optical return-to-zero signal is an optical differential return-to-zero signal, and the optical differential return-to-zero signal is associated with a frequency chirp.

According to another embodiment of the present invention, a system for generating an optical return-to-zero signal includes a system for coding and signal processing. The system for coding and signal processing is configured to receive an input electrical non-return-to-zero signal, process information associated with the input electrical non-return-to-zero signal, generate at least a first coded signal based on at least information associated with the input electrical non-return-to-zero signal, process information associated with the first coded signal, and generate at least a first delayed signal based on at least information associated with the first coded signal.

The first delayed signal being delayed with respect to the first coded signal by a first predetermined period of time. Additionally, the system for coding and signal processing is configured to process information associated with the first coded signal and the first delayed signal, and generate a first processed signal and a second processed signal based on at least information associated with the first coded signal and the first delayed signal. Moreover, the system for generating an optical return-to-zero signal includes a first driver configured to receive the first processed signal and generate a first driving signal, a second driver configured to receive the second processed signal and generate a second driving signal, a light source configured to generate a light, and an electro-optical modulator configured to receive the light, the first driving signal and the second driving signal, modulate the light with the first driving signal and the second driving signal, and generate an output optical signal. The output optical signal is an optical return-to-zero signal associated with a frequency chirp.

According to yet another embodiment of the present invention, a system for processing one or more signals includes a first time delay device configured to receive a first input signal and generate a first delayed signal. The first delayed signal is delayed with respect to the first input signal by a first predetermined period of time. Additionally, the system includes a second time delay device configured to received a second input signal and generate a second delayed signal. The second delayed signal is delayed with respect to the second input signal by a second predetermined period of time. Moreover, the system includes a first amplifier configured to receive the first input signal and the first delayed signal, determine a first difference between the first coded signal and the first delayed signal, process information associated with the first difference, and generate a first output signal based on at least information associated with the first difference. Also, the system includes a second amplifier configured to receive the second coded signal and the second delayed signal, determine a second difference between the second coded signal and the second delayed signal, process information associated with the second difference, and generate a second output signal based on at least information associated with the second difference.

According to yet another embodiment of the present invention, a system for processing one or more signals includes a first time delay device configured to receive a first input signal and generate a first delayed signal. The first delayed signal is delayed with respect to the first input signal by a first predetermined period of time. Additionally, the system includes a second time delay device configured to received a second input signal and generate a second delayed signal. The second delayed signal is delayed with respect to the second input signal by a second predetermined period of time. Moreover, the system includes a first AND gate configured to receive the first input signal and the second delayed signal, perform a first AND operation on the first input signal and the second delayed signal, and generate a first output signal based on at least information associated with the first AND operation. Also, the system includes a second AND gate configured to receive the second input signal and the first delayed signal, perform a second AND operation on the second input signal and the first delayed signal, and generate a second output signal based on at least information associated with the second AND operation.

According to yet another embodiment of the present invention, a system for coding and processing one or more signals includes a demultiplexer configured to receive an input signal and generate a first plurality of signals, and a plurality of XOR gates configured to receive a second plurality of signals related to the first plurality of signals and generate a third plurality of signals based on at least information associated with the second plurality of signals. Additionally, the system includes a plurality of inverters configured to receive the third plurality of signals and generate a fourth plurality of signals based on at least information associated with the third plurality of signals. Moreover, the system includes a first plurality of AND gates configured to receive the third plurality of signals and the fourth plurality of signals and generate a fifth plurality of signals, and a second plurality of AND gates configured to receive the third plurality of signals and the fourth plurality of signals and generate a sixth plurality of signals. Also, the system includes a first multiplexer configured to receive the fifth plurality of signals and generate a first output signal, and a second multiplexer configured to receive the sixth plurality of signals and generate a second output signal.

According to yet another embodiment of the present invention, a method for generating an optical return-to-zero signal includes receiving an input electrical non-return-to-zero signal, processing information associated with the input electrical non-return-to-zero signal, and generating an output optical return-to-zero signal based on at least information associated with the input electrical non-return-to-zero signal. The output optical return-to-zero signal is an optical differential return-to-zero signal, and the optical differential return-to-zero signal is associated with a frequency chirp.

Many benefits are achieved by way of the present invention over conventional techniques. Some embodiments of the present invention provide systems and methods for generating optical differential return-to-zero signals with frequency chirp. For example, an electrical non-return-to-zero input signal is pre-coded, and the pre-coded signal and its complementary signal are used for a signal processing system. In another example, the signal processing system selects and sends out in one electrical output signal the bits that are intended to have 0-degree phase shift in an optical output signal, and selects and sends out in another electrical output signal the bits that are intended to have 180-degree phase shift in the output optical signal. In one embodiment, the two electrical output signals are used to drive respectively the two arms of a dual drive Mach-Zehnder modulator biased at null. The optical output signal from the modulator is an optical return-to-zero signal with differential bi-phase shift and a frequency chirp. For example, the intensity of the optical output signal has identical logic sequence as the electrical non-return-to-zero input signal. In another example, every "1" pulse has a 180-degree phase shift from its nearest "1" pulses.

Certain embodiments of the present invention can generate an optical return-to-zero signal with differential bi-phase shift and frequency chirp. For example, the differential bi-phase shift can improve dispersion tolerance of the optical signal. In one embodiment, every return-to-zero pulse that represents a logic high level has a 180-degree phase shift from its nearest return-to-zero pulse that also represent the logic high level. So when the signal pulses are broadened by fiber dispersion, interference between the nearest return-to-zero pulses is destructive. In another example, the frequency chirp can increases signal resistance to nonlinear distortion and enhance signal transmission properties. In one embodiment, with negative frequency chirp, the optical return-to-zero signal would be compressed to shorter pulses after transmitting certain distance in positive dispersion fibers.

Some embodiments of the present invention use limiting amplifiers with differential inputs for differential signal processing system. Certain embodiments of the present invention use AND gates for differential signal processing system. For example, certain AND gates are used for parallel differential signal processing system. Some embodiments of the present invention limit the value of the time delay up to 1 bit period in differential signal processing system.

Certain embodiments of the present invention provide systems and methods that use only one Mach-Zehnder (MZ) data modulator to generate the differential RZ (DRZ) signals with frequency chirp. Some embodiments of the present invention can significantly lower the cost of a transmitter for optical DRZ signals with frequency chirp. Certain embodiments of the present invention can significantly reduce the complexity of a transmitter for optical DRZ signals with frequency chirp. Some embodiments of the present invention can significantly improve reliability of a transmitter for optical DRZ signals with frequency chirp. Certain embodiments of the present invention can significantly improve performance of a fiber optical transport system. For example, the fiber optical transport system is used for transmission at a high data rate, such as a rate higher than 10 Gbps.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a system and method for generating optical return-to-zero signals with differential bi-phase shift and frequency chirp. Merely by way of example, the invention is described as it applies to optical networks, but it should be recognized that the invention has a broader range of applicability.

Figure 1:
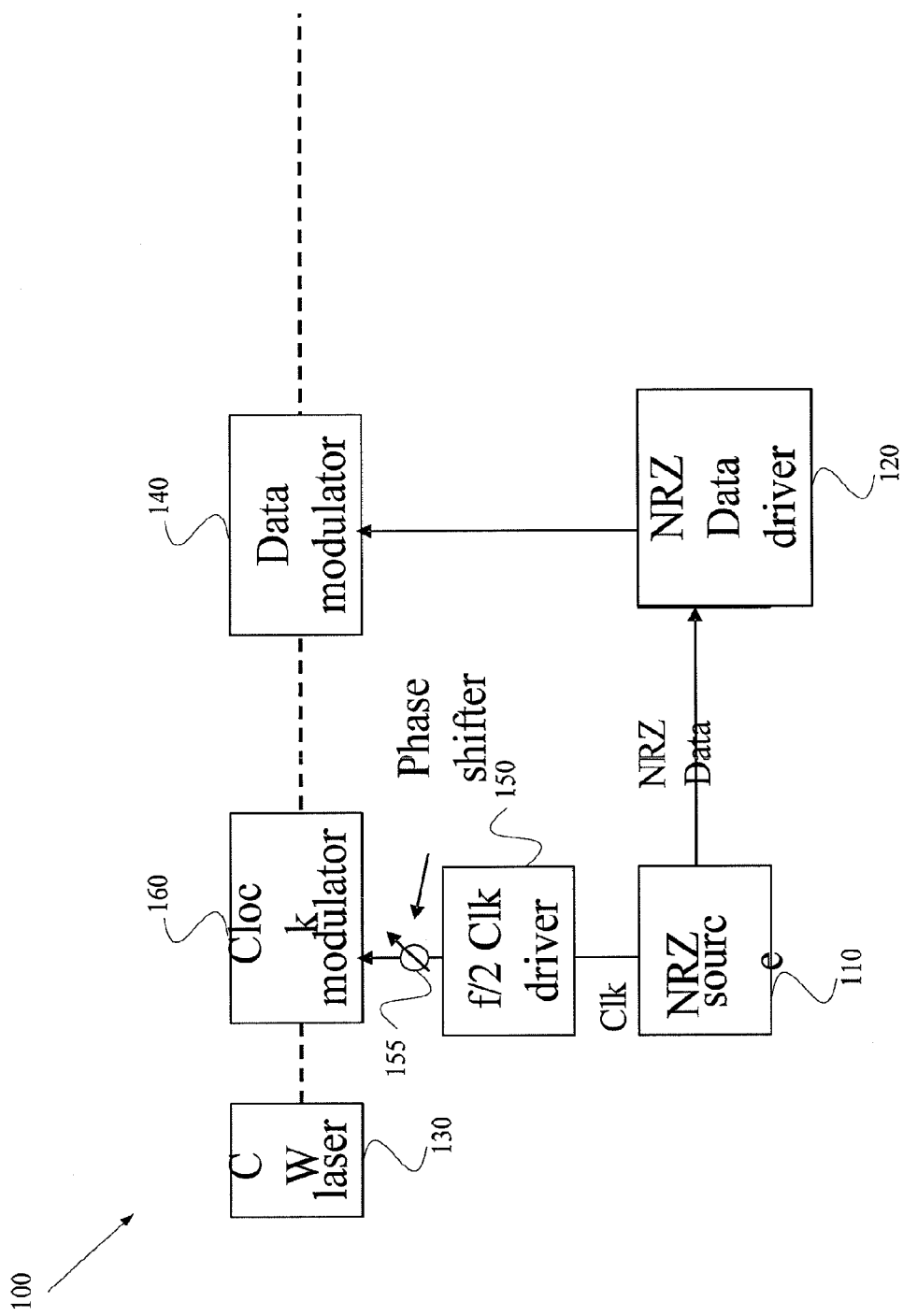
FIG. 1 is a simplified conventional system for generating CSRZ signals.

As shown in FIG. 1, the system 100 uses two EO modulators and related driving circuits to perform optical double modulations. For example, a first MZ modulator is used for clock-pulse modulations, and a second MZ modulator is used for data modulations. The clock pulses received by the first MZ modulator are often generated by nonstandard parts, which can be very expensive. Additionally, the optical data modulations and the optical clock modulations usually need to overlap temporally, so the clock pulses should be kept substantially at the center of the bit slot. But keeping the clock pulses substantially at the center of the bit slot is often difficult to achieve under various operating conditions or over a large temperature range.

Figure 2:
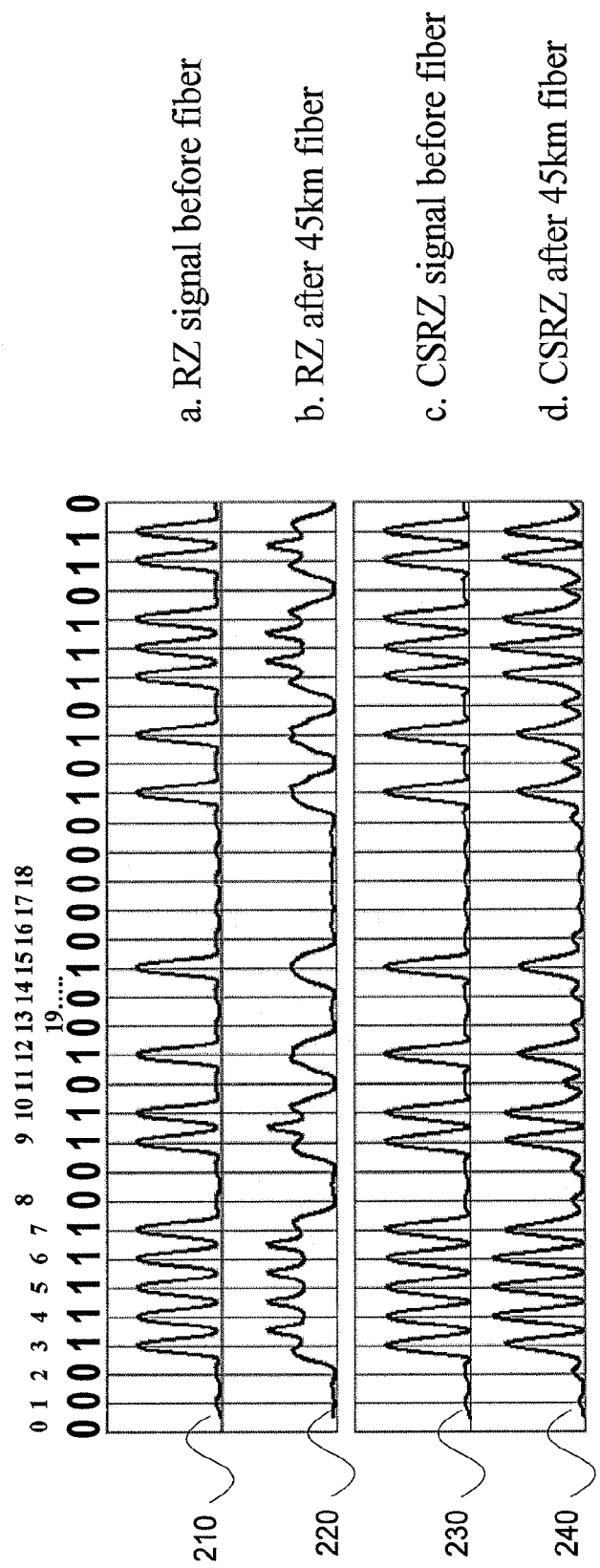
FIG. 2 is a simplified conventional diagram showing dispersion effects on various conventional RZ signals.

FIG. 2 is a simplified conventional diagram showing dispersion effects on various conventional RZ signals. Curve 210 represents a simple RZ signal that is intensity modulated. For example, the simple RZ signal has a 50% duty cycle at 10 Gigabits per second (Gbps). Curve 220 represents the simple RZ signal after 45-kilometer transmission in a single mode fiber. The total dispersion can be calculated as 45×17=765 ps/nm. As shown by the curve 220, because adjacent pulses in the simple RZ signal have the same phase, the pulse spreading can cause constructive interference. For example, the constructive interference can lower "1"s at bits 3, 4, and 5, and raise shoulders between bits 3 and 4, and between bits 4 and 5. Hence the pulses of the simple RZ signal are no longer intact. If the signal with such dispersion is received by a receiver without reconditioned by a dispersion compensator, there would often be significant penalties on the receiving sensitivity. In addition, if the signal with such dispersion has some appreciable power and continues to transmit in the fiber, the signal may suffer from nonlinear distortion that often cannot be recovered with linear dispersion compensation.

In contrast, curve 230 represents a CSRZ signal at 10 Gigabits per second (Gbps). Curve 240 represents the CSRZ signal after 45-kilometer transmission in the single mode fiber. As shown by the curve 240, because adjacent pulses in the CSRZ signal are out of phase by 180 degrees, the pulse spreading is reduced by destructive interference. Hence all pulses of the CSRZ signal remain largely intact. Accordingly, the CSRZ signal often suffers from a dispersion penalty that is smaller than one suffered by the simple RZ signal. Additionally, the nonlinear distortion can also be reduced.

But in the CSRZ signal, two pulses separated by another pulse still have the same phase, which can cause constructive interference. For example, the constructive interference occurs between two "1"s separated by a single "0". As shown by curve 240, the constructive interference between bits 11 and 13 raises the "0" level at bit 12. This interference often limits the dispersion tolerance of the CSRZ signal.

To address these issues, the operation principle of a conventional MZ modulator is analyzed as follows. For a conventional MZ modulator, an incoming optical field is separated into two portions with equal strength. After each portion passes through a path with a certain optical length, the two portions are recombined at the output. Due to the interference effect, the output optical field varies with optical length difference between the two paths. There are electrodes coated along the two paths, and the optical path difference can be varied with the electrical voltages applied on the electrodes through electro-optical (EO) effect. By modulating the applied voltages, the output optical field, and hence the optical intensity is modulated. Mathematically, the output optical field is related to the input by:

$$E_{OUT}=E_{IN}/2 \cdot \{\exp[-i \cdot \eta_1 \cdot D1(t) - i \cdot \phi] - \exp[-i \cdot \eta_2 \cdot D2(t) + i \cdot \phi]\} \quad \text{(Equation 1)}$$

where $E_{IN}$ and $E_{OUT}$ represent input optical field and output optical field respectively. For example, the input optical field is the input electric field, and the output optical field is the output electric field. Additionally, $D1(t)$ and $D2(t)$ represent the electrical signals applied on the electrodes respectively, and $\eta_1$ and $\eta_2$ each are determined by at least EO coefficient and length of the corresponding electrode. Moreover, $\phi$ is related to the inherent path difference and DC bias voltages applied on the electrodes. For each electrode, the total applied voltage equals the sum of the corresponding DC bias voltage and the voltage related to the corresponding electrical signal.

In a conventional dual drive MZ modulator, the electrodes often are configured so that $\eta_1=\eta_2=\eta$. For example, $\eta$ represents electro-optical phase modulation coefficient. Additionally, the MZ modulator can be biased with proper DC voltages such that $\phi=0$. For example, with $\phi=0$, the MZ modulator is referred to as being biased at null. Hence Equation 1 can be simplified as follows:

$$E_{OUT}=E_{IN} \sin\{[V1(t)-V2(t)] \cdot 0.5\} \cdot \exp\{-i \cdot [V1(t)+V2(t)] \cdot 0.5\} \quad \text{(Equation 2)}$$

$$\text{where } V1(t)=\eta \cdot D1(t) \quad \text{(Equation 3A)}$$

$$\text{and } V2(t)=\eta \cdot D2(t) \quad \text{(Equation 3B)}$$

Figure 3:
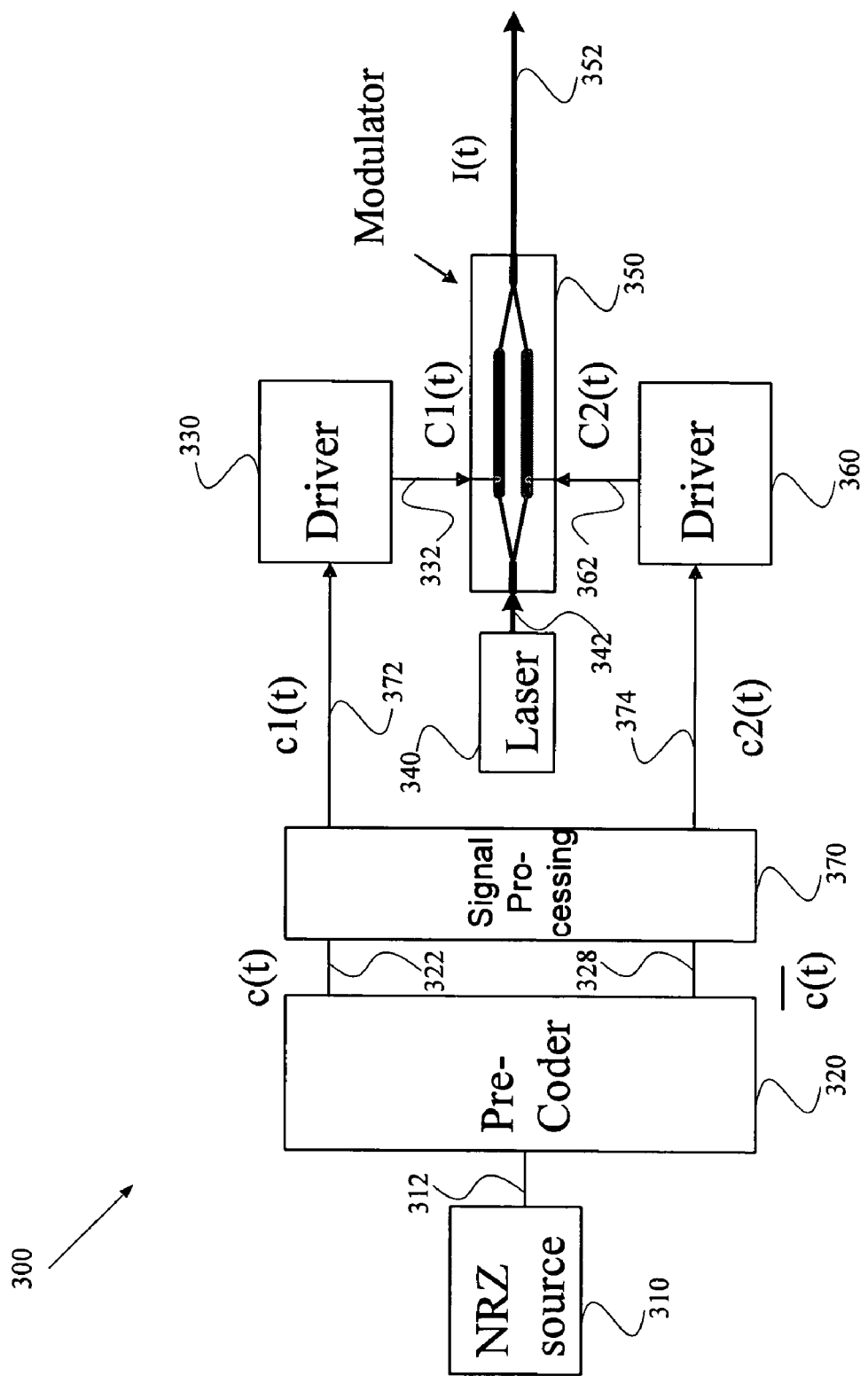
FIG. 3 is a simplified system for generating optical return-to-zero signals with differential bi-phase shift and frequency chirp according to an embodiment of the present invention.

FIG. 3 is a simplified system for generating optical return-to-zero signals with differential bi-phase shift and frequency chirp according to an embodiment of the present invention. This diagram is merely an example, which should not unduly limit the scope of the claims. One of ordinary skill in the art would recognize many variations, alternatives, and modifications. The system 300 includes an NRZ source 310, a pre-coder 320, drivers 330 and 360, a light source 340, a modulator 350, and a signal processing system 370. Although the above has been shown using a selected group of apparatuses for the system 300, there can be many alternatives, modifications, and variations. For example, the pre-coder 320 and the signal processing system 370 is combined into a combined system for pre-coder 320 and signal processing system 370. In another example, some of the apparatuses may be expanded. Other apparatuses may be inserted to those noted above. Depending upon the embodiment, the arrangement of apparatuses may be interchanged with others replaced. Further details of these apparatuses are found throughout the present specification and more particularly below.

The NRZ source 310 provides an electrical NRZ signal 312 to the pre-coder 320. For example, the NRZ signal 312 switches between a logic high level and a logic low level as a function of time. The logic high level can be represented by "1", and the logic low level can be represented by "0". In another example, the NRZ signal 312 represents data in a digital format based on the data information received from another device. In yet another example, the NRZ signal 312 is represented by d(t).

As shown in FIG. 3, the NRZ signal 312 is received by the pre-coder 320. For example, the pre-coder 320 is a coding device. The pre-coder 320 processes the NRZ signal 312 and generates coded signals 322 and 328. For example, the coded signal 322 is represented by c(t), and the coded signal 328 is represented by b(t).

In one embodiment, the NRZ signal 312 includes at least N bits, which are represented by $d_0, d_1, \ldots, d_n, \ldots,$ and $d_{N-1}$. N is an integer larger than 1, and n is an integer equal to or larger than 0, and smaller than N. Correspondingly, the coded signal 322 also includes at least N bits, which are represented by $c_0, c_1, \ldots, C_n, \ldots,$ and $C_{N-1}$. Additionally, the coded signal 328 also includes at least N bits, which are represented by $b_0, b_1, \ldots, b_n, \ldots,$ and $b_{N-1}$. For example, the coded signal 322 and the NRZ signal 312 have the following relationship:

$$c_m=c_{m-p} \oplus d_m \quad \text{(Equation 4)}$$

where m and m−p each are an integer equal to or larger than 0, and smaller than N. $\oplus$ represents modulo-2 addition. For example, the modulo-2 addition is an XOR operation. In one embodiment, the XOR operation is performed by one or more XOR gates. p is a positive number. For example, p is equal to 1. In one embodiment, $c_{m-p}$ precedes $c_m$ by a predetermined period of time. In another embodiment, the predetermined period of time equals p bit periods.

In another example, the coded signal 328 and the coded signal 322 have the following relationship:

$$b_m=-c_m=\bar{c}_m \quad \text{(Equation 5)}$$

Hence the coded signal 328 can be represented by $\bar{c}(t)$. In one embodiment, the coded signal 322 includes one or more rising edges, and/or one or more falling edges. For example, a rising edge exists when the signal 322 changes from a logic low level to a logic high level. In another example, a falling edge exists when the signal 322 changes from a logic high level to a logic low level. In another embodiment, the coded signal 328 includes one or more falling edges, and/or one or more rising edges. For example, a falling edge exists when the signal 328 changes from a logic high level to a logic low level. In another example, a rising edge exists when the signal 328 changes from a logic low level to a logic high level.

As shown in FIG. 3, the coded signals 322 and 328 are received by the signal processing system 370. For example, the signal processing system 370 is a bit separator. In another example, the pre-coder 320 and the signal processing system 370 are parts of a system for coding and signal processing. In response, the signal processing system 370 generates two signals 372 and 374. In one embodiment, the signal 372 includes a first plurality of pulses, each of which corresponds to a different rising edge in the coded signal 322. For example, each of the first plurality of pulses has a pulse width that is equal to or narrower than the bit width of the coded signal 322. In another example, the first plurality of pulses are positive pulses in voltage domain. In yet another example, if the signal 322 does not include any rising edge, the coded signal 372 does not include any pulse. As an example, the signal 372 remains at a constant voltage level, such as at zero volts.

In another embodiment, the signal 374 includes a second plurality of pulses, each of which corresponds to a different falling edge in the coded signal 322. For example, each of the second plurality of pulses has a pulse width that is equal to or narrower than the bit width of the coded signal 322. In another example, the second plurality of pulses are positive pulses in voltage domain. In yet another example, if the signal 322 does not include any falling edge, the coded signal 374 does not include any pulse. As an example, the signal 374 remains at a constant voltage level, such as at zero volts.

As shown in FIG. 3, the driver 330 receives the signal 372, and the driver 360 receives the signal 374. Additionally, the driver 330 amplifies the signal 372 and generates a driving signal 332. The driver 360 amplifies the signal 374 and generates a driving signal 362. For example, $c1(t)$ and $c2(t)$ as the signals 372 and 374 are fed into the drivers 330 and 360 respectively. Accordingly, the driving signal 332 is represented by $C1(t)$, and the driving signal 362 is represented by $C2(t)$. In one embodiment, the gains of the drivers 330 and 360 each are denoted as 2G. Hence $C1(t)$ and $C2(t)$ are determined by:

$$C1(t)=2 \cdot G \cdot c1(t) \quad \text{(Equation 6A)}$$

$$C2(t)=2 \cdot G \cdot c2(t) \quad \text{(Equation 6B)}$$

As shown in FIG. 3, the driving signals 332 and 362 are received by the modulator 350, which also receives a light 342 from the light source 340. For example, the light source 340 includes a CW diode laser. The light 342 is modulated by the driving signals 332 and 362 to generate an output optical signal 352. For example, the modulator 350 is a MZ modulator. Referring to Equations 2, 3A, 3B, 6A, and 6B, $D1(t)=C1(t)$ and $D2(t)=C2(t)$. With proper DC bias voltages, the optical field for the output signal 352 is $$E_{OUT}=E_{IN} \sin\{\eta \cdot G \cdot [c1(t)-c2(t)]\} \cdot \exp\{-i \cdot \eta \cdot G \cdot [c1(t)+c2(t)]\} \quad \text{(Equation 7)}$$

For example, without the second term $\exp\{-i \cdot \eta \cdot G \cdot [c1(t)+c2(t)]\}$, $E_{OUT}$ represents an optical return-to-zero signal without frequency chirp. For example, the optical return-to-zero signal is an optical differential RZ signal, such as an optical RZ signal with differential bi-phase shift. In one embodiment, the optical field of the optical differential RZ signal varies with time. For example, the optical field is the electric field. In another embodiment, for the optical field, every positive optical pulse is proceeded and followed by negative optical pulses, and every negative optical pulse is proceeded and followed by positive optical pluses. In yet another embodiment, every optical pulse that represents a logic high level has a 180-degree phase shift from its nearest optical pulses that also represent the logic high level. For example, the optical pulse that represents the logic high level can be separated from its nearest optical pulses that also represent the logic high level by zero, one, or more bits that do not represent the logic high level. In another example, the logic high level is represented by "1".

In another example, the physical meaning of the second term $\exp\{-i \cdot \eta \cdot G \cdot [c1(t)+c2(t)]\}$ is to provide a frequency chirp to the optical signal 352 as shown below:

$$\Delta\nu_{CHIRP}=-\eta \cdot G \cdot d[d_{RZ}(t)]/dt \cdot (1/2 \cdot \pi) \quad \text{(Equation 8)}$$

where $\Delta\nu_{CHIRP}$ represents the frequency chirp, such as an instantaneous frequency deviation. Additionally, $$d_{RZ}(t)=c1(t)+c2(t) \quad \text{(Equation 9)}$$

where $d_{RZ}(t)$ is proportional to the optical intensity for the output signal 352 according to an embodiment of the present invention. As shown in Equations 7 and 8, the output signal 352 is a chirped returned-to-zero signal in one embodiment of the present invention. For example, the chirped return-to-zero signal is a frequency-modulated signal. In another example, the chirped return-to-zero signal has a frequency that varies with time, the variation of frequency staying within a range.

In another embodiment, the chirped return-to-zero signal is an optical differential RZ signal with frequency chirp, such as an optical RZ signal with differential bi-phase shift and frequency chirp.

As shown in Equation 8, the phase modulation $-\eta \cdot G \cdot d_{RZ}(t)$ is negatively proportional to the optical intensity for the output signal 352 if $\eta$ is larger than zero. Hence the frequency chirp is negative in sign. In another example, the phase modulation $-\eta \cdot G \cdot d_{RZ}(t)$ is positively proportional to the optical intensity for the output signal 352 if $\eta$ is smaller than zero. Accordingly, the frequency chirp is positive in sign. Additionally, the signals 312, 322, 328, 372, 374, 332, and 362 each are an electrical signal according to another embodiment of the present invention.

As discussed above and further emphasized here, FIG. 3 is merely an example, which should not unduly limit the scope of the claims. One of ordinary skill in the art would recognize many variations, alternatives, and modifications. For example, the signal processing system 370 is modified so that the signal 372 is represented by $\bar{c}1(t)$, and the signal 374 is represented by $\bar{c}2(t)$. $\bar{c}1(t)$ and $\bar{c}2(t)$ have the following relationship with $c1(t)$ and $c2(t)$ respectively:

$$\bar{c}1(t)=-c1(t) \quad \text{(Equation 10A)}$$

$$\bar{c}2(t)=-c2(t) \quad \text{(Equation 10B)}$$

Consequently, with proper DC bias voltages, the optical field for the output signal 352 is $$E_{OUT}=E_{IN} \sin\{\eta \cdot G \cdot [c2(t)-c1(t)]\} \cdot \exp\{i \cdot \eta \cdot G \cdot [c1(t)+c2(t)]\} \quad \text{(Equation 11)}$$

As shown in Equation 11, the phase modulation is positively proportional to the optical intensity for the output signal 352 if $\eta$ is larger than zero. Hence the frequency chirp is positive in sign. In another example, the phase modulation is negatively proportional to the optical intensity for the output signal 352 if $\eta$ is smaller than zero. Accordingly, the frequency chirp is negative in sign. In one embodiment, the electrical NRZ signal 312 represents a logic sequence, and the output signal 352 represents another logic sequence. These two logic sequences are the same.

In another example, the drivers 330 and 360 are modified so that the driving signal 332 is represented by $\bar{C}1(t)$, and the signal 374 is represented by $\bar{C}2(t)$. $\bar{C}1(t)$ and $\bar{C}2(t)$ have the following relationship with $C1(t)$ and $C2(t)$ respectively:

$$\bar{C}1(t)=-C1(t) \quad \text{(Equation 12A)}$$

$$\bar{C}2(t)=-C2(t) \quad \text{(Equation 12B)}$$

Consequently, with proper DC bias voltages, the optical field for the output signal 352 is described according to Equation 11. As shown in Equation 11, the phase modulation is positively proportional to the optical intensity for the output signal 352 if $\eta$ is larger than zero. Hence the frequency chirp is positive in sign. In another example, the phase modulation is negatively proportional to the optical intensity for the output signal 352 if $\eta$ is smaller than zero. Accordingly, the frequency chirp is negative in sign. In one embodiment, the electrical NRZ signal 312 represents a logic sequence, and the output signal 352 represents another logic sequence. These two logic sequences are the same.

Figure 4:
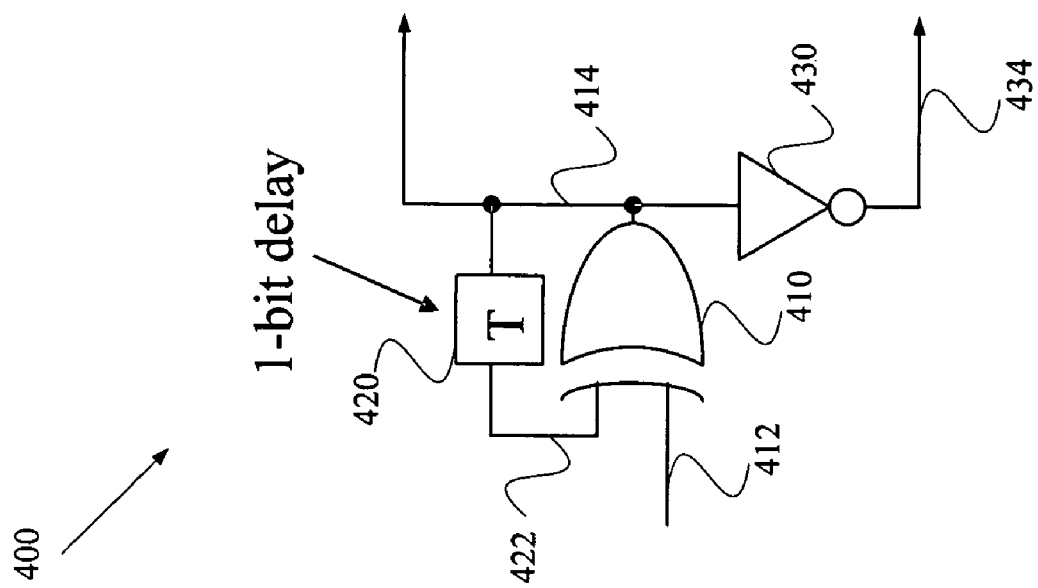
FIG. 4 is a simplified pre-coder used in system for generating optical return-to-zero signals with differential bi-phase shift and frequency chirp according to an embodiment of the present invention.

FIG. 4 is a simplified pre-coder used in system 300 for generating optical return-to-zero signals with differential bi-phase shift and frequency chirp according to an embodiment of the present invention. This diagram is merely an example, which should not unduly limit the scope of the claims. One of ordinary skill in the art would recognize many variations, alternatives, and modifications. The pre-coder 400 includes an XOR gate 410, a time delay device 420, and an inverter 430. Although the above has been shown using a selected group of apparatuses for the signal processing system 400, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The XOR gate 410 receives at least an NRZ signal 412 and generates a coded signal 414. As shown in FIG. 4, the coded signal 414 is received by the time delay device 420. In response, the time delay device 420 generates a feedback signal 422. The feedback signal 422 is delayed by p bits in comparison with the coded signal 414. For example, p is a positive number. In another example, p is equal to 1. The feedback signal 422 is received by the XOR gate 410. The XOR gate 410 performs an exclusive-OR operation to the received signals 412 and 422, and generates the coded signal 414. The coded signal 414 is received by at least the inverter 430, which generates a coded signal 434 in response.

Figure 5:
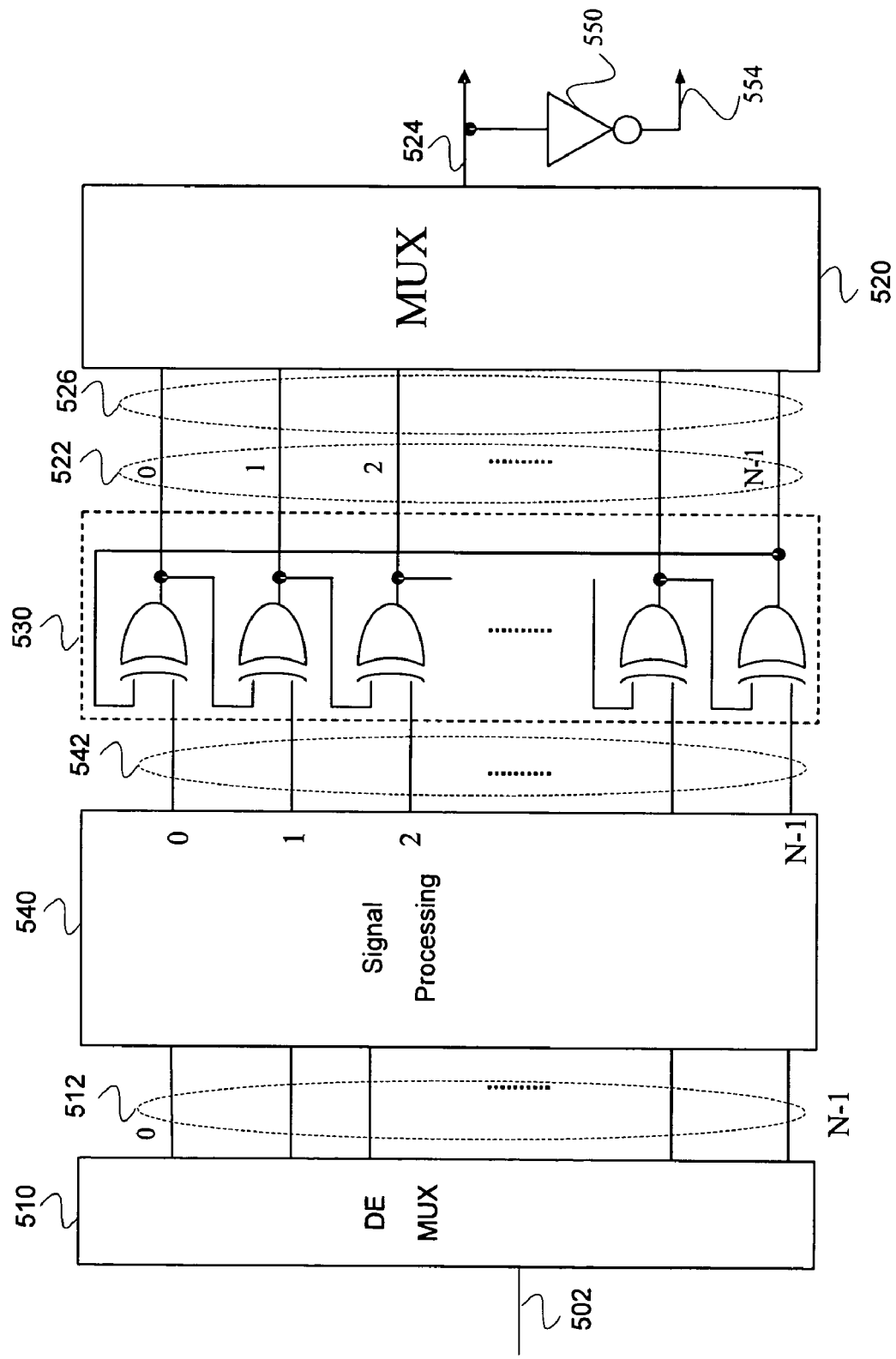
FIG. 5 is a simplified pre-coder used in system for generating optical return-to-zero signals with differential bi-phase shift and frequency chirp according to another embodiment of the present invention.

FIG. 5 is a simplified pre-coder used in system 300 for generating optical return-to-zero signals with differential bi-phase shift and frequency chirp according to another embodiment of the present invention. This diagram is merely an example, which should not unduly limit the scope of the claims. One of ordinary skill in the art would recognize many variations, alternatives, and modifications. The pre-coder 500 includes a demultiplexer 510, a multiplexer 520, a plurality of XOR gates 530, a signal processing system 540, and an inverter 550. Although the above has been shown using a selected group of apparatuses for the pre-coder 500, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The demultiplexer 510 receives an NRZ signal 502, and demultiplexes the NRZ signal 502 into a plurality of output signals 512. For example, the demultiplexer 510 is a serial-to-parallel demultiplexer. The plurality of output signals 512 includes N output signals. N is an integer larger than 1. For example, the N output signals include signal 512_0, signal 512_1, . . . signal 512_n, . . . , and signal 512_N–1. n is an integer equal to or larger than 0, and smaller than N. In another example, the NRZ signal 502 corresponds to a clock frequency f, and each of the output signals 512 corresponds to a clock frequency f/N. In yet another example, the NRZ signal 502 includes at least an N-bit sequence, and the N-bit sequence includes bit 0, bit 1, . . . bit n, . . . , and bit N–1. As shown in FIG. 5, bit 0 is demultiplexed into signal 512_0, bit 1 is demultiplexed into signal 512_1, . . . , bit n is demultiplexed into signal 512_n, . . . , and bit N–1 is demultiplexed into signal 512_N–1.

In one embodiment, the plurality of signals 512 is received by the signal processing system 540. For example, the signal processing system 540 includes a SONET framer. In another example, the signal processing system 540 includes a forward error correction (FEC) encoder. The signal processing system 540 processes the plurality of signals 512 and outputs a plurality of signals 542. The plurality of signals 542 includes N signals. For example, the N signals include signal 542_0, signal 542_1, . . . signal 542_n, . . . , and signal 542_N–1. Signal 542_0 corresponds to signal 512_0, signal 542_1 corresponds to signal 512_1, . . . , signal 542_n corresponds to signal 512_n, . . . , and signal 542_N–1 corresponds to signal 512_N–1.

The plurality of signals 542 is received by the plurality of XOR gates 530. The plurality of XOR gates 530 includes N XOR gates. For example, the N XOR gates include XOR gate 530_0, XOR gate 530_1, . . . XOR gate 530_n, . . . , and XOR gate 530_N–1. As shown in FIG. 5, the XOR gate 530_0 receives at least the signal 542_0, the XOR gate 530_1 receives at least the signal 542_1, . . . , the XOR gate 530_n receives at least the signal 542_n, . . . , and the XOR gate 530_N–1 receives at least the signal 542_N–1.

The plurality of XOR gates 530 generates a plurality of signals 522. The plurality of signals 522 includes N signals. For example, the N signals include signal 522_0, signal 522_1, . . . signal 522_n, . . . , and signal 522_N–1. The signal 522_0 is generated by the XOR gate 530_0, the signal 522_1 is generated by the XOR gate 530_1, . . . , the signal 522_n is generated by the XOR gate 530_n, . . . , and the signal 522_N–1 is generated by the XOR gate 530_N–1. As shown in FIG. 5, the plurality of signals 522 is received by the plurality of XOR gates 530. For example, the signal 522_0 is received by the XOR gate 530_1, the signal 522_1 is received by the XOR gate 530_2, . . . the signal 822_n is received by the XOR gate 530_n+1 if n is an integer equal to or larger than 0 and smaller than N–1, . . . , and the signal 522_N–1 is received by the XOR gate 530_0. Each of the plurality of XOR gates 530 performs an exclusive-OR operation to the received signals, and generates the corresponding one of the plurality of signals 522.

The plurality of signals 522 is received by the multiplexer 520. For example, the multiplexer 520 is a parallel-to-serial multiplexer. The multiplexer 520 includes a plurality of input terminals 526. For example, the plurality of input terminals includes terminal 526_0, terminal 526_1, . . . , terminal 526_n, . . . , and terminal 526_N–1. Terminal 526_0, terminal 526_1, . . . , terminal 526_n, . . . , and terminal 526_N–1 receive signal 522_0, signal 522_1, . . . signal 522_n, . . . , and signal 522_N–1 respectively. In response, the multiplexer 520 generates a coded signal 524. The coded signal 524 is received by at least the inverter 550, which generates a coded signal 554 in response.

In another example, if the signal processing system 540 and the plurality of XOR gates 530 are removed, the plurality of signals 522 hence is the same as the plurality of signals 512. Consequently, the multiplexer 520 can output a signal same as the NRZ signal 502, and the inverter 550 can output a signal equal to the NRZ signal 502 multiplied by –1 in signal strength.

As discussed above and further emphasized here, FIG. 5 is merely an example, which should not unduly limit the scope of the claims. One of ordinary skill in the art would recognize many variations, alternatives, and modifications. For example, the signal processing system 540 is removed. The plurality of signals 512 is directly received by the plurality of XOR gates 530 respectively.

Figure 6:
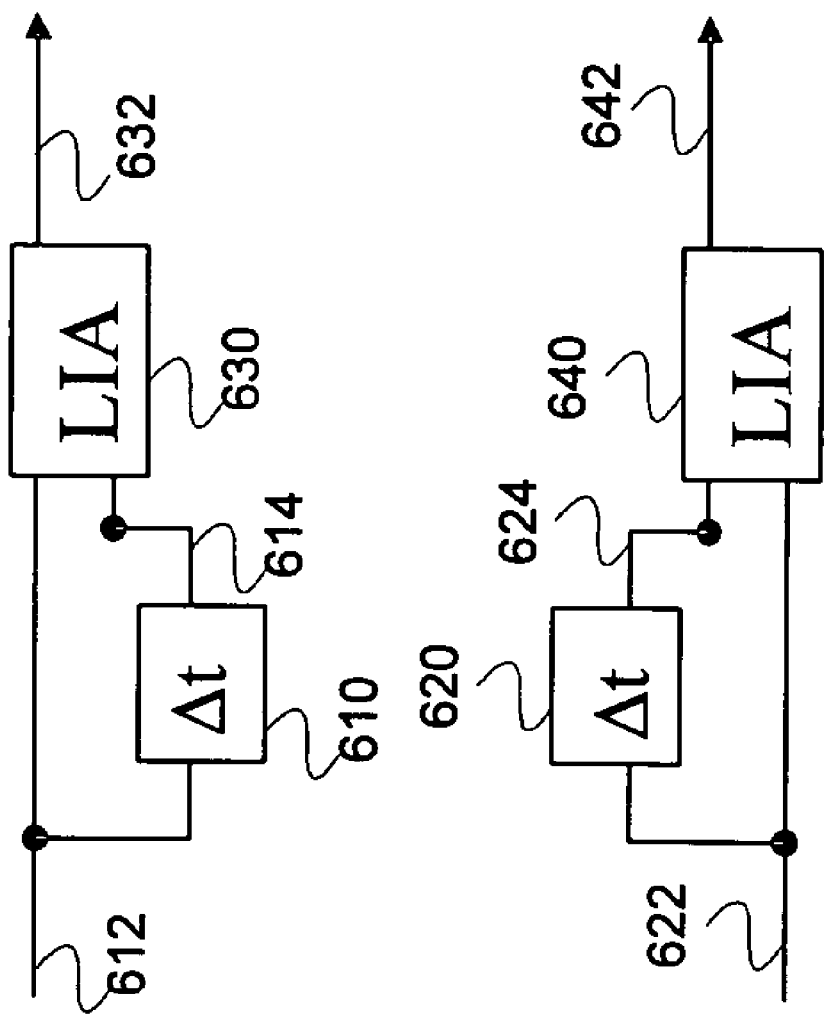
FIG. 6 is a simplified signal processing system according to an embodiment of the present invention.

FIG. 6 is a simplified signal processing system according to an embodiment of the present invention. This diagram is merely an example, which should not unduly limit the scope of the claims. One of ordinary skill in the art would recognize many variations, alternatives, and modifications. The signal processing system 600 includes time delay devices 610 and 620, and differential limiting amplifiers 630 and 640.

Although the above has been shown using a selected group of apparatuses for the signal processing system 600, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The time delay device 610 receives an input signal 612 and generates a delayed signal 614. The delayed signal 614 is delayed by p bits in comparison with the input signal 612. For example, p is a positive number. In another example, p is larger than 0, and equal to or smaller than 1. In yet another example, p is equal to 0.7. Additionally, the time delay device 620 receives an input signal 622 and generates a delayed signal 624. The delayed signal 624 is delayed by q bits in comparison with the input signal 622. For example, q is a positive number. In another example, q is equal to p. In another example, q is larger than 0, and equal to or smaller than 1. In yet another example, q is equal to 0.7.

The input signal 612 and the delayed signal 614 are received by the differential limiting amplifier 630 to generate an output signal 632. If the difference between the input signal 612 and the delayed signal 614 is larger than a predetermined threshold, the output signal 632 is at a logic high level. If the difference between the input signal 612 and the delayed signal 614 is equal to or smaller than the predetermined threshold, the output signal 632 is at a logic low level.

Additionally, the input signal 622 and the delayed signal 624 are received by the differential limiting amplifier 640 to generate an output signal 642. If the difference between the input signal 622 and the delayed signal 624 is larger than a predetermined threshold, the output signal 642 is at a logic high level. If the difference between the input signal 622 and the delayed signal 624 is equal to or smaller than the predetermined threshold, the output signal 642 is at a logic low level.

Figure 7:
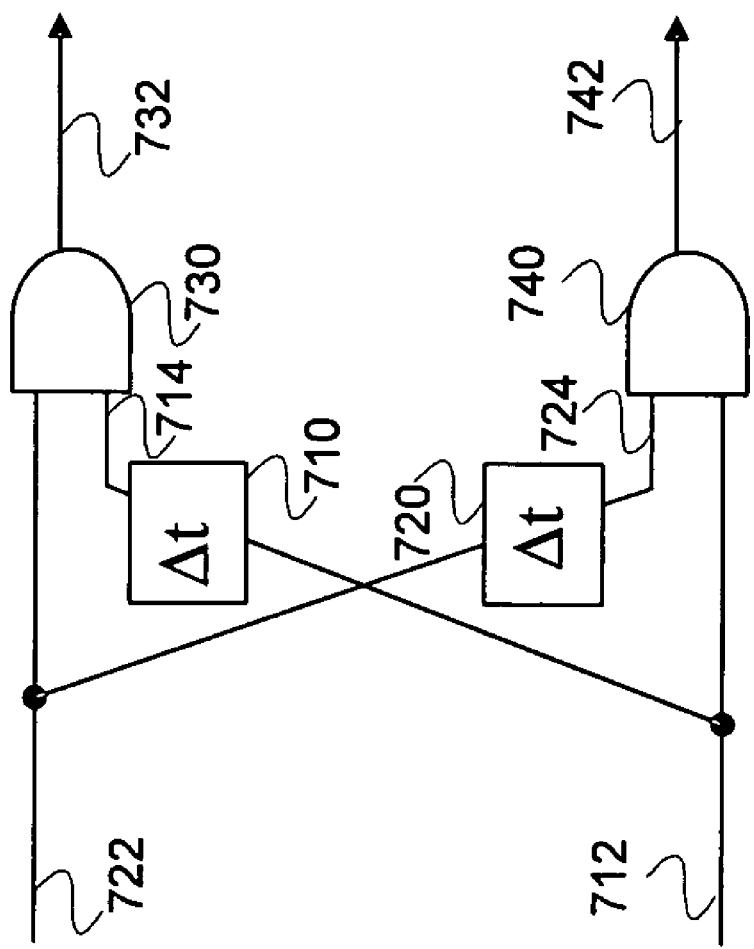
FIG. 7 is a simplified signal processing system according to another embodiment of the present invention.

FIG. 7 is a simplified signal processing system according to another embodiment of the present invention. This diagram is merely an example, which should not unduly limit the scope of the claims. One of ordinary skill in the art would recognize many variations, alternatives, and modifications. The signal processing system 700 includes time delay devices 710 and 720, and AND gates 730 and 740. Although the above has been shown using a selected group of apparatuses for the signal processing system 700, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The time delay device 710 receives an input signal 712 and generates a delayed signal 714. The delayed signal 714 is delayed by p bits in comparison with the input signal 712. For example, p is a positive number. In another example, p is larger than 0, and equal to or smaller than 1. In yet another example, p is equal to 0.7. Additionally, the time delay device 720 receives an input signal 722 and generates a delayed signal 724. The delayed signal 724 is delayed by q bits in comparison with the input signal 722. For example, q is a positive number. In another example, q is equal to p. In yet another example, q is larger than 0, and equal to or smaller than 1. In yet another example, q is equal to 0.7.

The delayed signal 714 is received by the AND gate 730, which also receives the input signal 722. The AND gate 730 performs an AND logic function between the delayed signal 714 and the input signal 722 to generate an output signal 732. Additionally, the delayed signal 724 is received by the AND gate 740, which also receives the input signal 712. The AND gate 740 performs an AND logic function between the delayed signal 724 and the input signal 712 to generate an output signal 742.

Figure 8:
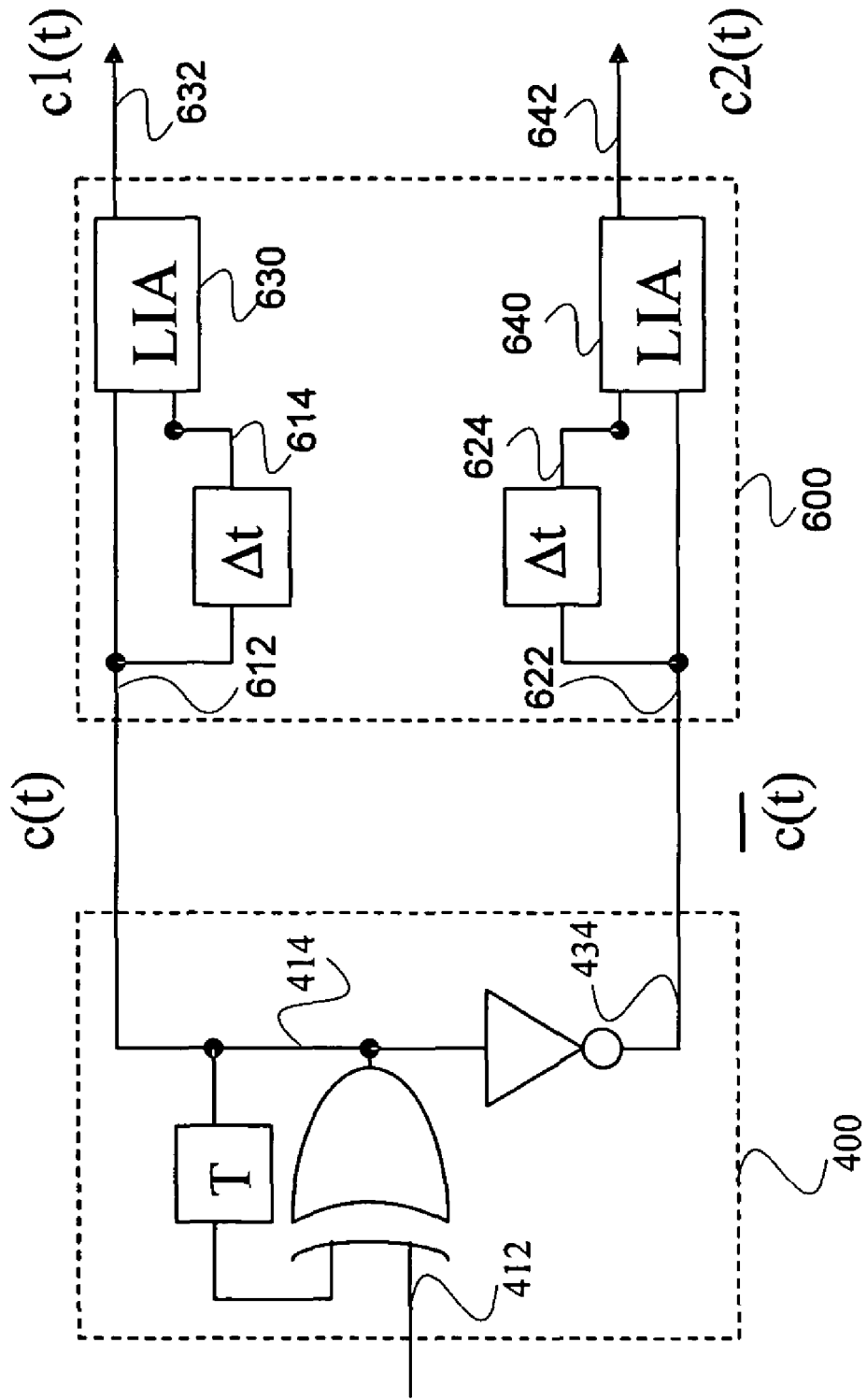
FIG. 8 is a simplified diagram showing pre-coder and signal processing system in system for generating optical return-to-zero signals with differential bi-phase shift and frequency chirp according to an embodiment of the present invention.

FIG. 8 is a simplified diagram showing pre-coder 400 and signal processing system 600 in system 300 for generating optical return-to-zero signals with differential bi-phase shift and frequency chirp according to an embodiment of the present invention. For example, the pre-coder 400 is used as the pre-coder 320, and the signal processing system 600 is used as the signal processing system 370. This diagram is merely an example, which should not unduly limit the scope of the claims. One of ordinary skill in the art would recognize many variations, alternatives, and modifications.

As shown in FIG. 8, the input signal 412 is the NRZ signal 312. Additionally, the output signal 414 and the input signal 612 are the same as the coded signal 322. The output signal 434 and the input signal 622 are the same as the coded signal 328. Moreover, the output signal 632 is the signal 372, and the output signal 642 is the signal 374.

In one embodiment, the coded signal 322 is represented by c(t), and the coded signal 328 is represented by $\bar{c}(t)$. Additionally, the delayed signal 614 is repented by c(t−Δt), and the delayed signal 624 is represented by $\bar{c}(t-\Delta t)$. Δt represents a period of time corresponding to p bits, and p is equal to q.

The coded signal 322 and the delayed signal 614 are received by the differential limiting amplifier 630. The difference between the coded signal 322 and the delayed signal 614 is represented by a differential signal c(t)−c(t−Δt). For example, the differential signal includes positive and negative pulses. If the differential signal c(t)−c(t−Δt) is higher than a predetermined threshold, the output signal 372 is at a logic high level. If the differential signal c(t)−c(t−Δt) is equal to or lower than a predetermined threshold, the output signal 372 is at a logic low level.

The coded signal 328 and the delayed signal 624 are received by the differential limiting amplifier 640. The difference between the coded signal 328 and the delayed signal 624 is represented by a differential signal $\bar{c}(t)-\bar{c}(t-\Delta t)$. For example, the differential signal includes positive and negative pulses. If the differential signal $\bar{c}(t)-\bar{c}(t-\Delta t)$ is higher than a predetermined threshold, the output signal 374 is at a logic high level. If the differential signal $\bar{c}(t)-\bar{c}(t-\Delta t)$ is equal to or lower than a predetermined threshold, the output signal 374 is at a logic low level.

Figure 9:
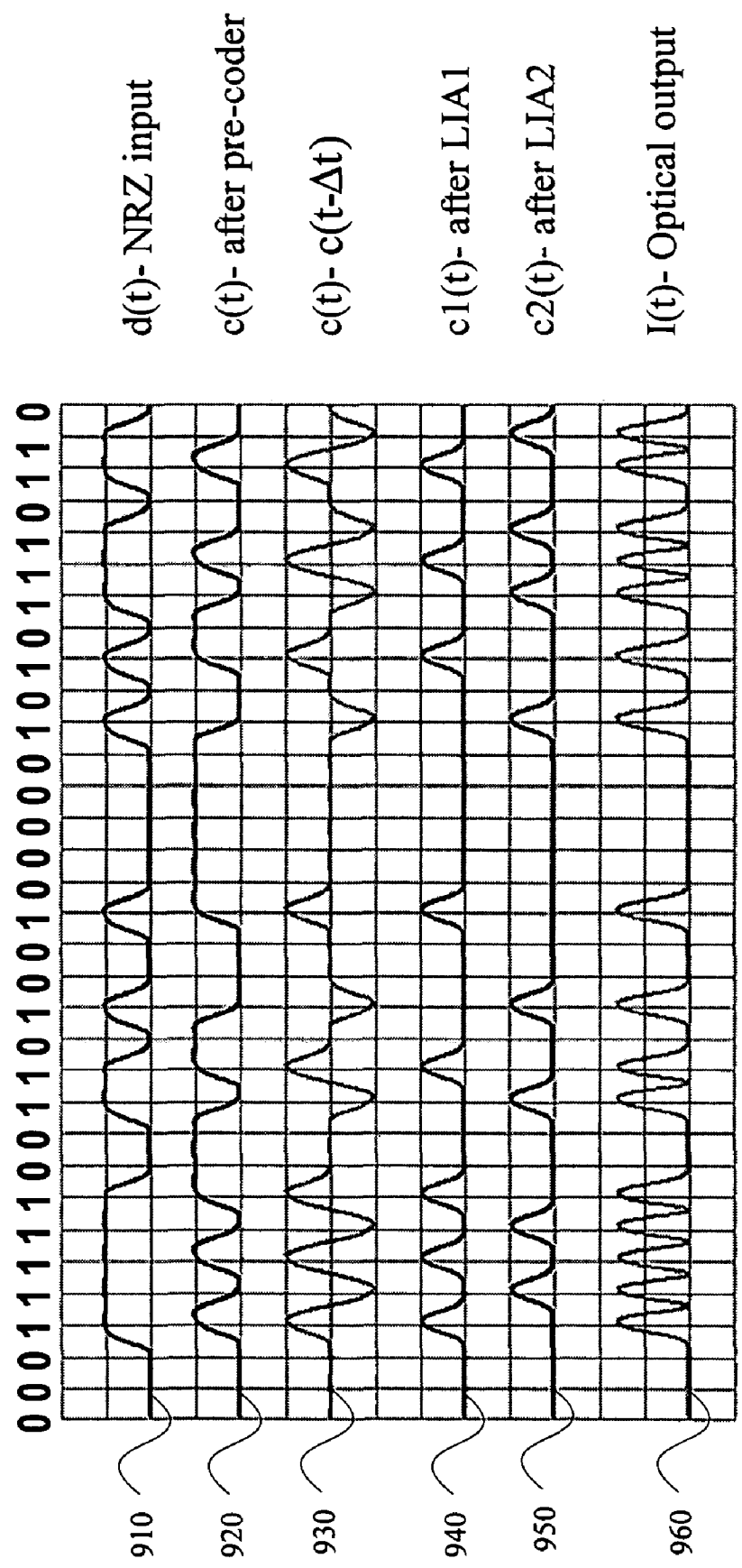
FIG. 9 shows a simplified signal diagram for system for generating optical return-to-zero signals with differential bi-phase shift and frequency chirp using pre-coder and signal processing system according to an embodiment of the present invention.

FIG. 9 shows a simplified signal diagram for system 300 for generating optical return-to-zero signals with differential bi-phase shift and frequency chirp using pre-coder 400 and signal processing system 600 according to an embodiment of the present invention. This diagram is merely an example, which should not unduly limit the scope of the claims. One of ordinary skill in the art would recognize many variations, alternatives, and modifications. For example, curves 910, 920, 930, 940 and 950 represent the signal 312, the signal 322, the difference between the signal 322 and the delayed signal 614, the signal 372, and the signal 374 respectively. Additionally, curve 960 represents the signal 352 outputted by the modulator 350.

In one embodiment, the signals 312, 322, 614, 372, and 374 are electrical signals, and the signal 352 is an optical signal. In another embodiment, the curves 910, 920, 930, 940 and 950 represent signal voltage as a function of time, and the curve 960 represents signal intensity as a function of time. For example, the delayed signal 614 is delayed by 0.7 bit period with respect to the signal 322. In another example, the predetermined threshold for the differential limiting amplifier 630 is equal to 0.5 if the difference between the signal 322 and the delayed signal 614 is assumed to swing between +1 and −1.

Figure 10:
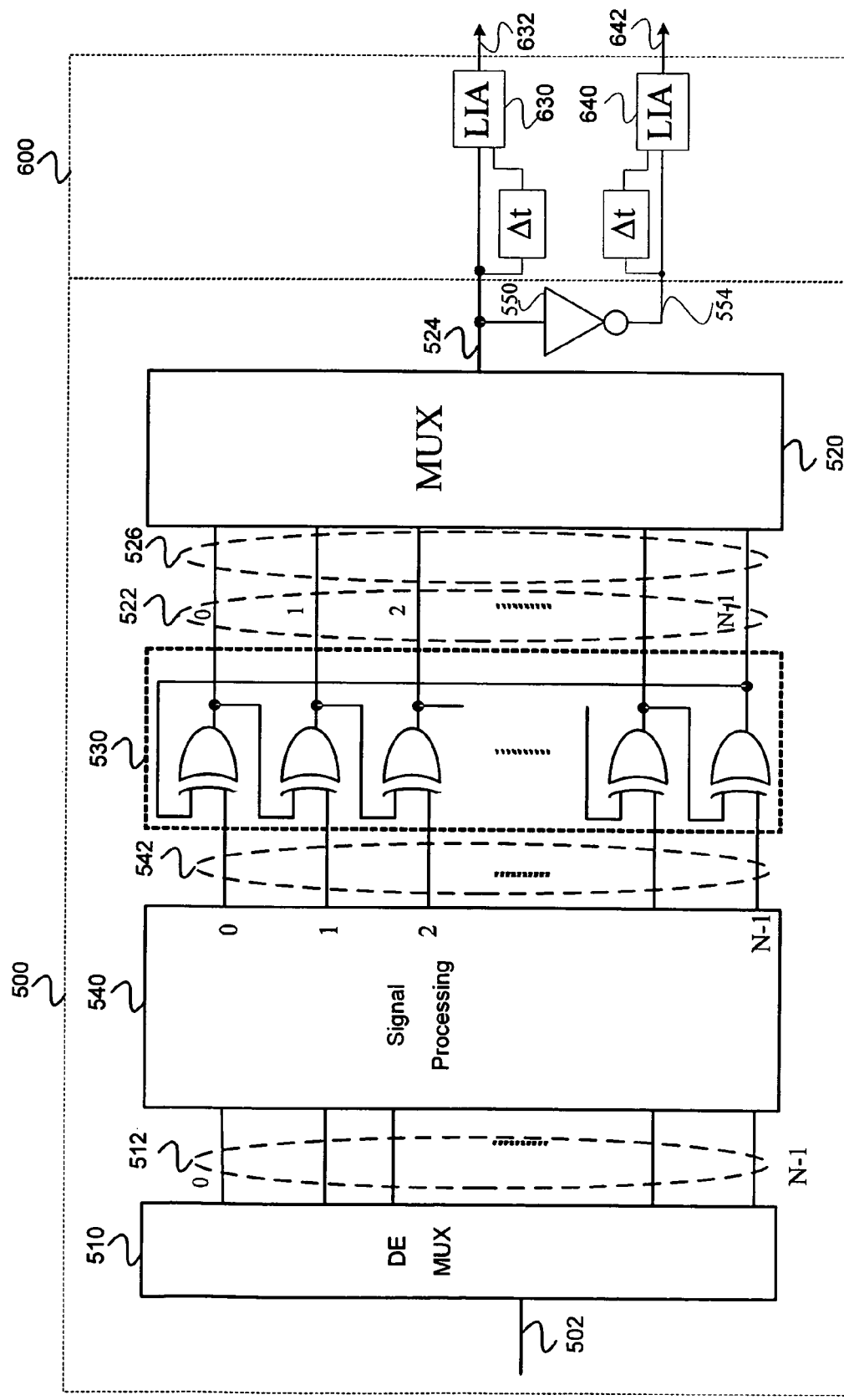
FIG. 10 is a simplified diagram showing pre-coder and signal processing system in system for generating optical return-to-zero signals with differential bi-phase shift and frequency chirp according to another embodiment of the present invention.

FIG. 10 is a simplified diagram showing pre-coder 500 and signal processing system 600 in system 300 for generating optical return-to-zero signals with differential bi-phase shift and frequency chirp according to another embodiment of the present invention. This diagram is merely an example, which should not unduly limit the scope of the claims. One of ordinary skill in the art would recognize many variations, alternatives, and modifications. For example, the pre-coder 500 is used as the pre-coder 320, and the signal processing system 600 is used as the signal processing system 370. In one embodiment, the input signal 502 is the NRZ signal 312. Additionally, the output signal 524 and the input signal 612 are the same as the coded signal 322. The output signal 554 and the input signal 622 are the same as the coded signal 328. Moreover, the output signal 632 is the signal 372, and the output signal 642 is the signal 374.

Figure 11:
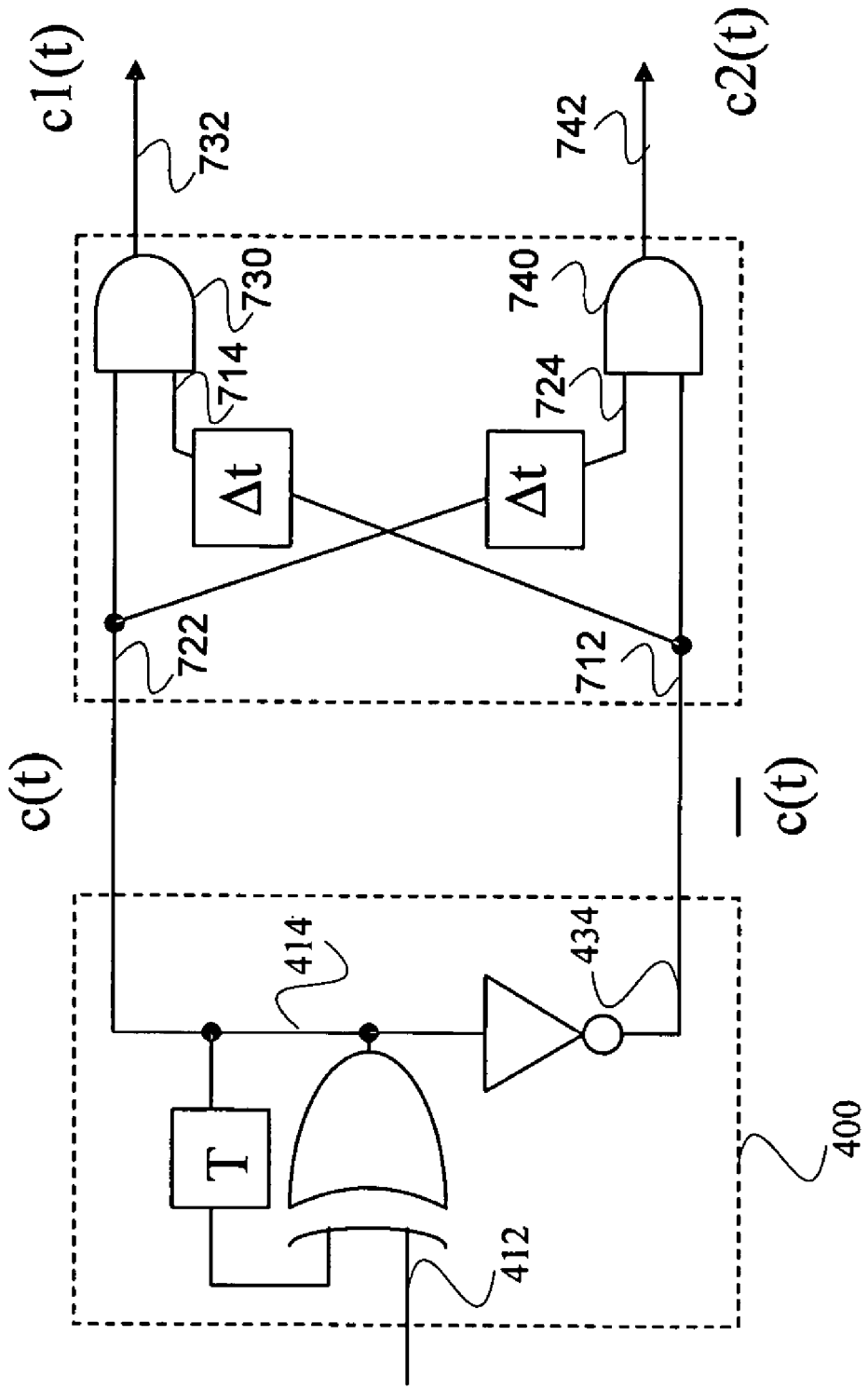
FIG. 11 is a simplified diagram showing pre-coder and signal processing system in system for generating optical return-to-zero signals with differential bi-phase shift and frequency chirp according to yet another embodiment of the present invention.

FIG. 11 is a simplified diagram showing pre-coder 400 and signal processing system 700 in system 300 for generating optical return-to-zero signals with differential bi-phase shift and frequency chirp according to yet another embodiment of the present invention. For example, the pre-coder 400 is used as the pre-coder 320, and the signal processing system 700 is used as the signal processing system 370. This diagram is merely an example, which should not unduly limit the scope of the claims. One of ordinary skill in the art would recognize many variations, alternatives, and modifications.

As shown in FIG. 11, the input signal 412 is the NRZ signal 312. Additionally, the output signal 414 and the input signal 722 are the same as the coded signal 322. The output signal 434 and the input signal 712 are the same as the coded signal 328. Moreover, the output signal 732 is the signal 372, and the output signal 742 is the signal 374.

In one embodiment, the coded signal 322 is represented by c(t), and the coded signal 328 is represented by c̄(t). Additionally, the delayed signal 724 is repented by c(t-Δt), and the delayed signal 714 is represented by c̄(t−Δt). Δt represents a period of time corresponding to p bits, and p is equal to q.

The coded signal 322 and the delayed signal 714 are received by the AND gate 730. The AND gate 730 performs an AND logic function between the delayed signal 714 and the coded signal 322 to generate the signal 372. Additionally, the coded signal 328 and the delayed signal 724 are received by the AND gate 740. The AND gate 740 performs an AND logic function between the delayed signal 724 and the coded signal 328 to generate the signal 374.

According to yet another embodiment of the present invention, the system 300 for generating optical return-to-zero signals with differential bi-phase shift and frequency chirp uses the pre-coder 500 and signal processing system 700. For example, the pre-coder 500 is used as the pre-coder 320, and the signal processing system 700 is used as the signal processing system 370. In one embodiment, the input signal 502 is the NRZ signal 312. Additionally, the output signal 524 and the input signal 722 are the same as the coded signal 322. The output signal 554 and the input signal 712 are the same as the coded signal 328. Moreover, the output signal 732 is the signal 372, and the output signal 742 is the signal 374.

Figure 12:
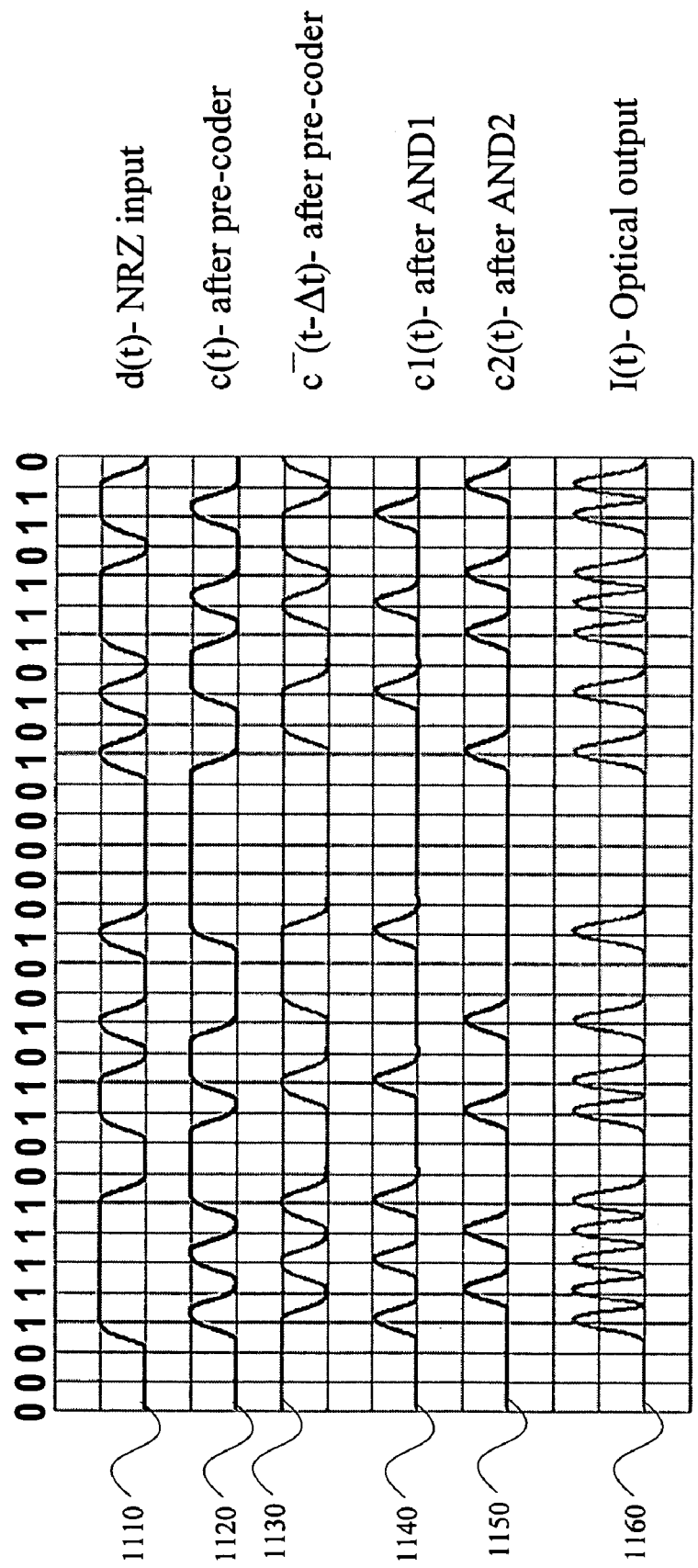
FIG. 12 shows a simplified signal diagram for system for generating optical return-to-zero signals with differential bi-phase shift and frequency chirp using pre-coder and signal processing system according to another embodiment of the present invention.

FIG. 12 shows a simplified signal diagram for system 300 for generating optical return-to-zero signals with differential bi-phase shift and frequency chirp using pre-coder 400 and signal processing system 700 according to another embodiment of the present invention. This diagram is merely an example, which should not unduly limit the scope of the claims. One of ordinary skill in the art would recognize many variations, alternatives, and modifications. For example, curves 1110, 1120, 1130, 1140 and 1150 represent the signal 312, the signal 322, the delayed signal 714, the signal 372, and the signal 374 respectively. Additionally, curve 1160 represents the signal 352 outputted by the modulator 350.

In one embodiment, the signals 312, 322, 714, 372, and 374 are electrical signals, and the signal 352 is an optical signal. In another embodiment, the curves 1110, 1120, 1130, 1140 and 1150 represent signal voltage as a function of time, and the curve 1160 represents signal intensity as a function of time. For example, the delayed signal 714 is delayed by 0.7 bit period with respect to the signal 328.

Figure 13:
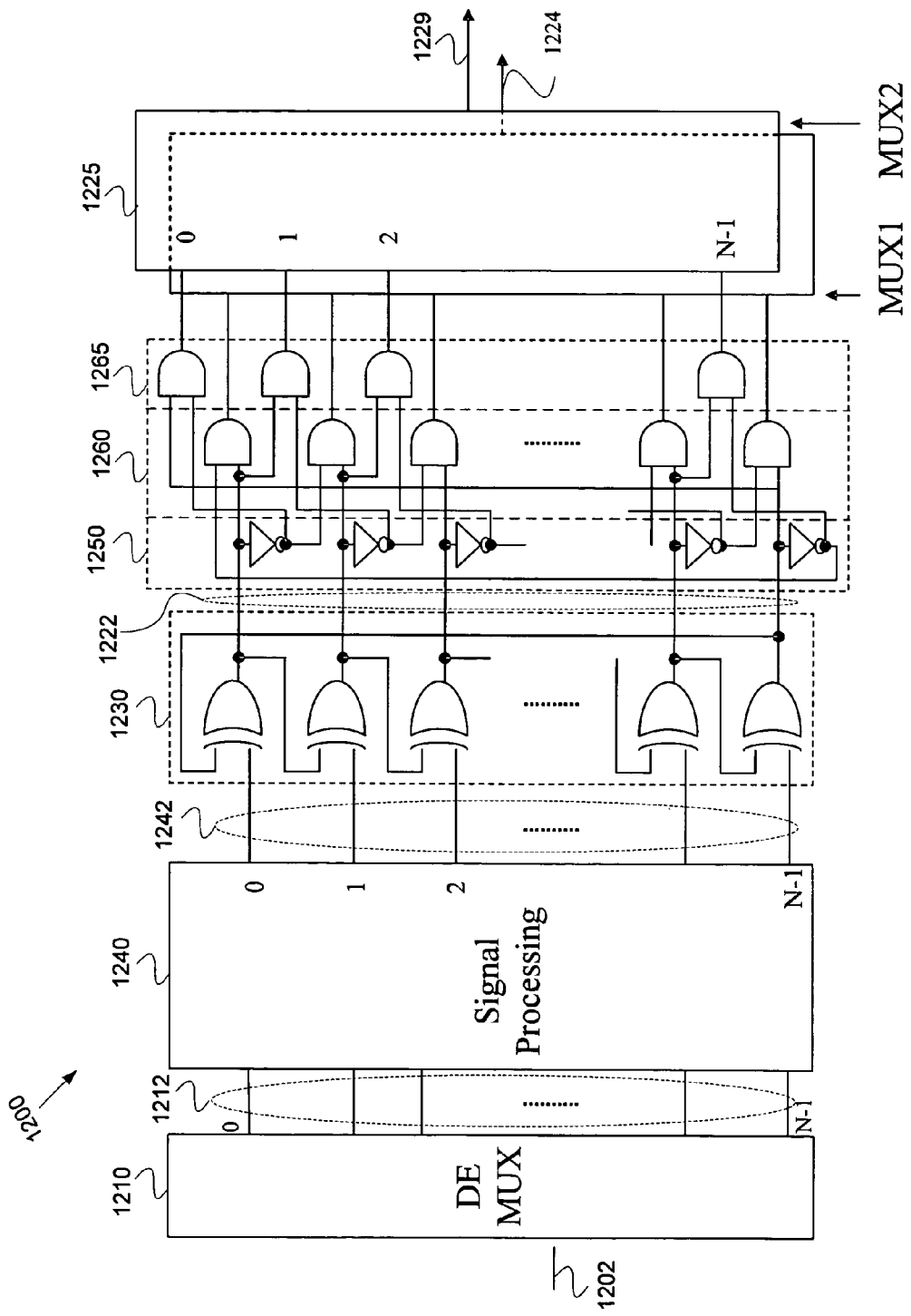
FIG. 13 is a simplified diagram showing a combined system for pre-coder and signal processing system in system for generating optical return-to-zero signals with differential bi-phase shift and frequency chirp according to another embodiment of the present invention.

FIG. 13 is a simplified diagram showing a combined system for pre-coder 320 and signal processing system 370 in system 300 for generating optical return-to-zero signals with differential bi-phase shift and frequency chirp according to another embodiment of the present invention. This diagram is merely an example, which should not unduly limit the scope of the claims. One of ordinary skill in the art would recognize many variations, alternatives, and modifications. The system 1200 includes a demultiplexer 1210, multiplexers 1220 and 1225, a plurality of XOR gates 1230, a signal processing system 1240, a plurality of inverters 1250, a plurality of AND gates 1260, and another plurality of AND gates 1265. Although the above has been shown using a selected group of apparatuses for the system 1200, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The demultiplexer 1210 receives an NRZ signal 1202, and demultiplexes the NRZ signal 1202 into a plurality of output signals 1212. For example, the demultiplexer 1210 is a serial-to-parallel demultiplexer. In another example, the NRZ signal 1202 is the signal 312. The plurality of output signals 1212 includes N output signals. N is an integer larger than 1. For example, the N output signals include signal 1212_0, signal 1212_1, ... signal 1212_n, ..., and signal 1212_N−1. n is an integer equal to or larger than 0, and smaller than N. In another example, the NRZ signal 1202 corresponds to a clock frequency f, and each of the output signals 1212 corresponds to a clock frequency f/N. In yet another example, the NRZ signal 1202 includes at least an N-bit sequence, and the N-bit sequence includes bit 0, bit 1, ... bit n ..., and bit N−1. As shown in FIG. 13, bit 0 is demultiplexed into signal 1212_0, bit 1 is demultiplexed into signal 1212_1, ... , bit n is demultiplexed into signal 1212_n, ... , and bit N−1 is demultiplexed into signal 1212_N−1.

In one embodiment, the plurality of signals 1212 is received by the signal processing system 1240. For example, the signal processing system 1240 includes a SONET framer. In another example, the signal processing system 1240 includes a forward error correction (FEC) encoder. The signal processing system 1240 processes the plurality of signals 1212 and outputs a plurality of signals 1242. The plurality of signals 1242 includes N signals. For example, the N signals include signal 1242_0, signal 1242_1, ... signal 1242_n, ..., and signal 1242_N−1. Signal 1242_0 corresponds to signal 1212_0, signal 1242_1 corresponds to signal 1212_1, ..., signal 1242_n corresponds to signal 1212_n, ..., and signal 1242_N-1 corresponds to signal 1212_N-1.

The plurality of signals 1242 is received by the plurality of XOR gates 1230. The plurality of XOR gates 1230 includes N XOR gates. For example, the N XOR gates include XOR gate 1230_0, XOR gate 1230_1, ... XOR gate 1230_n, ..., and XOR gate 1230_N-1. As shown in FIG. 13, the XOR gate 1230_0 receives at least the signal 1242_0, the XOR gate 1230_1 receives at least the signal 1242_1, ..., the XOR gate 1230_n receives at least the signal 1242_n, ..., and the XOR gate 1230_N-1 receives at least the signal 1242_N-1.

The plurality of XOR gates 1230 generates a plurality of signals 1222. The plurality of signals 1222 includes N signals. For example, the N signals include signal 1222_0, signal 1222_1, ... signal 1222_n, ..., and signal 1222_N-1. The signal 1222_0 is generated by the XOR gate 1230_0, the signal 1222_1 is generated by the XOR gate 1230_1, ..., the signal 1222_n is generated by the XOR gate 1230_n, ..., and the signal 1222_N-1 is generated by the XOR gate 1230_N-1.

As shown in FIG. 13, the plurality of signals 1222 is received by the plurality of inverters 1250. For example, the signal 1222_0 is received by the inverter 1250_0, the signal 1222_1 is received by the inverter 1250_1, ... the signal 1222_n is received by the inverter 1250_n, ..., and the signal 1222_N-1 is received by the inverter 1250_N-1. Each of the plurality of inverters 1250 performs a NOT operation to the received signal, and generates the corresponding one of the plurality of inverted signals.

The plurality of inverted signals is received by the plurality of AND gates 1260. For example, the inverted signal inverted_0 is received by the AND gate 1260_1, the inverted signal inverted_1 is received by the AND gate 1260_2, ... the inverted signal inverted_n is received by the AND gate 1260_n+1 if n is an integer equal to or larger than 0 and smaller than N-1, ..., and the inverted signal inverted_N-1 is received by the AND gate 1260_0. Additionally, the plurality of AND gates 1260 receives the plurality of signals 1222 respectively. For example, the signal 1222_0 is received by the AND gate 1260_0, the signal 1222_1 is received by the AND gate 1260_1, ... the signal 1222_n is received by the AND gate 1260_n, ..., and the signal 1222_N-1 is received by the AND gate 1260_N-1. Each of the plurality of AND gates 1260 performs an AND operation to the received signals, and generates the corresponding one of the first plurality of output signals.

Also, the plurality of inverted signals is received by the plurality of AND gates 1265. For example, the inverted signal inverted_0 is received by the AND gate 1265_0, the inverted signal inverted_1 is received by the AND gate 1265_1, ... the inverted signal inverted_n is received by the AND gate 1265_n, ..., and the inverted signal inverted_N-1 is received by the AND gate 1265_N-1. Additionally, the plurality of AND gates 1265 receives the plurality of signals 1222 respectively. For example, the signal 1222_0 is received by the AND gate 1265_1, the signal 1222_1 is received by the AND gate 1265_2, ... the signal 1222_n is received by the AND gate 1265_n+1 if n is an integer equal to or larger than 0 and smaller than N-1, ..., and the signal 1222_N-1 is received by the AND gate 1265_0. Each of the plurality of AND gates 1265 performs an AND operation to the received signals, and generates the corresponding one of the second plurality of output signals.

As shown in FIG. 13, the first plurality of output signals is received by the multiplexer 1220. For example, the multiplexer 1220 is a parallel-to-serial multiplexer. In another example, the multiplexer 1220 includes N input terminals. The N input terminals receive the first plurality of output signals respectively. In response, the multiplexer 1220 generates a coded signal 1224. For example, the coded signal 1224 is the signal 322. Additionally, the second plurality of output signals is received by the multiplexer 1225. For example, the multiplexer 1225 is a parallel-to-serial multiplexer. In another example, the multiplexer 1225 includes N input terminals. The N input terminals receive the second plurality of output signals respectively. In response, the multiplexer 1225 generates a coded signal 1229. For example, the coded signal 1229 is the signal 328.

As discussed above and further emphasized here, FIG. 13 is merely an example, which should not unduly limit the scope of the claims. One of ordinary skill in the art would recognize many variations, alternatives, and modifications. For example, the signal processing system 1240 is removed. The plurality of signals 1212 is directly received by the plurality of XOR gates 1230 respectively.

According to another embodiment of the present invention, a system for generating an optical return-to-zero signal includes an electro-optical conversion system. The electro-optical conversion system is configured to receive an input electrical non-return-to-zero signal, process information associated with the input electrical non-return-to-zero signal, and generate an output optical return-to-zero signal based on at least information associated with the input electrical non-return-to-zero signal. The output optical return-to-zero signal is an optical differential return-to-zero signal, and the optical differential return-to-zero signal is associated with a frequency chirp. For example, the system is implemented according to the system 300.

According to yet another embodiment of the present invention, a system for generating an optical return-to-zero signal includes a system for coding and signal processing. The system for coding and signal processing is configured to receive an input electrical non-return-to-zero signal, process information associated with the input electrical non-return-to-zero signal, generate at least a first coded signal based on at least information associated with the input electrical non-return-to-zero signal, process information associated with the first coded signal, and generate at least a first delayed signal based on at least information associated with the first coded signal. The first delayed signal being delayed with respect to the first coded signal by a first predetermined period of time. Additionally, the system for coding and signal processing is configured to process information associated with the first coded signal and the first delayed signal, and generate a first processed signal and a second processed signal based on at least information associated with the first coded signal and the first delayed signal. Moreover, the system for generating an optical return-to-zero signal includes a first driver configured to receive the first processed signal and generate a first driving signal, a second driver configured to receive the second processed signal and generate a second driving signal, a light source configured to generate a light, and an electro-optical modulator configured to receive the light, the first driving signal and the second driving signal, modulate the light with the first driving signal and the second driving signal, and generate an output optical signal. The output optical signal is an optical return-to-zero signal associated with a frequency chirp. For example, the system is implemented according to the system 300.

According to yet another embodiment of the present invention, a system for processing one or more signals includes a first time delay device configured to receive a first input signal and generate a first delayed signal. The first delayed signal is delayed with respect to the first input signal by a first predetermined period of time. Additionally, the system includes a second time delay device configured to received a second input signal and generate a second delayed signal. The second delayed signal is delayed with respect to the second input signal by a second predetermined period of time. Moreover, the system includes a first amplifier configured to receive the first input signal and the first delayed signal, determine a first difference between the first coded signal and the first delayed signal, process information associated with the first difference, and generate a first output signal based on at least information associated with the first difference. Also, the system includes a second amplifier configured to receive the second coded signal and the second delayed signal, determine a second difference between the second coded signal and the second delayed signal, process information associated with the second difference, and generate a second output signal based on at least information associated with the second difference. For example, the system is implemented according to the system 600.

According to yet another embodiment of the present invention, a system for processing one or more signals includes a first time delay device configured to receive a first input signal and generate a first delayed signal. The first delayed signal is delayed with respect to the first input signal by a first predetermined period of time. Additionally, the system includes a second time delay device configured to received a second input signal and generate a second delayed signal. The second delayed signal is delayed with respect to the second input signal by a second predetermined period of time. Moreover, the system includes a first AND gate configured to receive the first input signal and the second delayed signal, perform a first AND operation on the first input signal and the second delayed signal, and generate a first output signal based on at least information associated with the first AND operation. Also, the system includes a second AND gate configured to receive the second input signal and the first delayed signal, perform a second AND operation on the second input signal and the first delayed signal, and generate a second output signal based on at least information associated with the second AND operation. For example, the system is implemented according to the system 700.

According to yet another embodiment of the present invention, a system for coding and processing one or more signals includes a demultiplexer configured to receive an input signal and generate a first plurality of signals, and a plurality of NOR gates configured to receive a second plurality of signals related to the first plurality of signals and generate a third plurality of signals based on at least information associated with the second plurality of signals. Additionally, the system includes a plurality of inverters configured to receive the third plurality of signals and generate a fourth plurality of signals based on at least information associated with the third plurality of signals. Moreover, the system includes a first plurality of AND gates configured to receive the third plurality of signals and the fourth plurality of signals and generate a fifth plurality of signals, and a second plurality of AND gates configured to receive the third plurality of signals and the fourth plurality of signals and generate a sixth plurality of signals. Also, the system includes a first multiplexer configured to receive the fifth plurality of signals and generate a first output signal, and a second multiplexer configured to receive the sixth plurality of signals and generate a second output signal. For example, the system is implemented according to the system 1200.

According to yet another embodiment of the present invention, a method for generating an optical return-to-zero signal includes receiving an input electrical non-return-to-zero signal, processing information associated with the input electrical non-return-to-zero signal, and generating an output optical return-to-zero signal based on at least information associated with the input electrical non-return-to-zero signal. The output optical return-to-zero signal is an optical differential return-to-zero signal, and the optical differential return-to-zero signal is associated with a frequency chirp. For example, the method is performed by the system 300.

The present invention has various advantages. Some embodiments of the present invention provide systems and methods for generating optical differential return-to-zero signals with frequency chirp. For example, an electrical non-return-to-zero input signal is pre-coded, and the pre-coded signal and its complementary signal are used for a signal processing system. In another example, the signal processing system selects and sends out in one electrical output signal the bits that are intended to have 0-degree phase shift in an optical output signal, and selects and sends out in another electrical output signal the bits that are intended to have 180-degree phase shift in the output optical signal. In one embodiment, the two electrical output signals are used to drive respectively the two arms of a dual drive Mach-Zehnder modulator biased at null. The optical output signal from the modulator is an optical return-to-zero signal with differential bi-phase shift and a frequency chirp. For example, the intensity of the optical output signal has identical logic sequence as the electrical non-return-to-zero input signal. In another example, every "1" pulse has a 180-degree phase shift from its nearest "1" pulses.

Certain embodiments of the present invention can generate an optical return-to-zero signal with differential bi-phase shift and frequency chirp. For example, the differential bi-phase shift can improve dispersion tolerance of the optical signal. In one embodiment, every return-to-zero pulse that represents a logic high level has a 180-degree phase shift from its nearest return-to-zero pulse that also represent the logic high level. So when the signal pulses are broadened by fiber dispersion, interference between the nearest return-to-zero pulses is destructive. In another example, the frequency chirp can increases signal resistance to nonlinear distortion and enhance signal transmission properties. In one embodiment, with negative frequency chirp, the optical return-to-zero signal would be compressed to shorter pulses after transmitting certain distance in positive dispersion fibers.

Some embodiments of the present invention use limiting amplifiers with differential inputs for differential signal processing system. Certain embodiments of the present invention use AND gates for differential signal processing system. For example, certain AND gates are used for parallel differential signal processing system. Some embodiments of the present invention limit the value of the time delay up to 1 bit period in differential signal processing system.

Certain embodiments of the present invention provide systems and methods that use only one MZ data modulator to generate the differential RZ (DRZ) signals with frequency chirp. Some embodiments of the present invention can significantly lower the cost of a transmitter for optical DRZ signals with frequency chirp. Certain embodiments of the present invention can significantly reduce the complexity of a transmitter for optical DRZ signals with frequency chirp. Some embodiments of the present invention can significantly improve reliability of a transmitter for optical DRZ signals with frequency chirp. Certain embodiments of the present invention can significantly improve performance of a fiber optical transport system. For example, the fiber optical transport system is used for transmission at a high data rate, such as a rate higher than 10 Gbps.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for generating an optical return-to-zero signal, the system comprising:
a system for coding and signal processing, the system for coding and signal processing being configured to:
receive an input electrical non-return-to-zero signal;
process information associated with the input electrical non-return-to-zero signal;
generate at least a first coded signal based on at least information associated with the input electrical non-return-to-zero signal;
process information associated with the first coded signal;
generate at least a first delayed signal based on at least information associated with the first coded signal, the first delayed signal being delayed with respect to the first coded signal by a first predetermined period of time;
process information associated with the first coded signal and the first delayed signal;
generate a first processed signal and a second processed signal based on at least information associated with the first coded signal and the first delayed signal;
a first driver configured to receive the first processed signal and generate a first driving signal;
a second driver configured to receive the second processed signal and generate a second driving signal;
a light source configured to generate a light;
an electro-optical modulator configured to receive the light, the first driving signal and the second driving signal, modulate the light with the first driving signal and the second driving signal, and generate an output optical signal;
wherein:
the output optical signal is an optical return-to-zero signal associated with a frequency chirp;
the optical return-to-zero signal comprises a plurality of pulses; and
the frequency chirp has a uniform sign for every pulse of the plurality of pulses;
wherein the system for coding and signal processing is further configured to:
generate a second coded signal;
receive the second coded signal;
process information associated with the second coded signal;
generate a second delayed signal based on at least information associated with the second coded signal, the second delayed signal being delayed with respect to the second coded signal by a second predetermined period of time;
process information associated with the second coded signal and the second delayed signal; and
generate the first processed signal and the second processed signal based on at least information associated with the first coded signal, the first delayed signal, the second coded signal, and the second delayed signal; and
wherein the system for coding and signal processing comprises:

a first time delay device configured to receive the first coded signal and generate the first delayed signal;
a second time delay device configured to received the second coded signal and generate the second delayed signal;
a first amplifier configured to:
receive the first coded signal and the first delayed signal;
determine a first difference between the first coded signal and the first delayed signal;
process information associated with the first difference; and
generate the first processed signal based on at least information associated with the first difference; and
a second amplifier configured to:
receive the second coded signal and the second delayed signal;
determine a second difference between the second coded signal and the second delayed signal;
process information associated with the second difference; and
generate the second processed signal based on at least information associated with the second difference.

2. The system of claim 1 wherein the first predetermined period of time is equal to or less than one bit period associated with the first coded signal.

3. The system of claim 1 wherein the frequency chirp is positive.

4. The system of claim 1 wherein the frequency chirp is negative.

5. The system of claim 1 wherein the second coded signal is equal to the first coded signal multiplied by a negative number in signal strength.

6. The system of claim 1 wherein the first predetermined period of time and the second predetermined period of time are the same.

7. The system of claim 1 wherein the first processed signal is at a first logic level if the first difference is larger than a predetermined threshold.

8. The system of claim 7 wherein:
the first processed signal is at a second logic level if the first difference is equal to or smaller than the predetermined threshold;
the first logic level and the second logic level are different.

9. The system of claim 1 wherein the system for coding and signal processing comprises:
a first time delay device configured to receive the first coded signal and generate the first delayed signal;
a second time delay device configured to received the second coded signal and generate the second delayed signal;
a first AND gate configured to:
receive the first coded signal and the second delayed signal;
perform a first AND operation on the first coded signal and the second delayed signal;
generate the first processed signal based on at least information associated with the first AND operation,
a second AND gate configured to:
receive the second coded signal and the first delayed signal;
perform a second AND operation on the second coded signal and the first delayed signal;
generate the second processed signal based on at least information associated with the second AND operation.

10. The system of claim 1 wherein the first coded signal at a first time is associated with a result of modulo-2 addition of the input electrical non-return-to-zero signal at the first time and the first coded signal at a second time, the second time preceding the first time by a third predetermined period of time.

11. The system of claim 10 wherein the modulo-2 addition of the input electrical non-return-to-zero signal at the first time and the first coded signal at the second time is an XOR operation on the input electrical non-return-to-zero signal at the first time and the first coded signal at the second time.

12. The system of claim 1 wherein the optical return-to-zero signal is an optical differential return-to-zero signal associated with the frequency chirp.

13. The system of claim 1, and further comprising a non-return-to-zero source configured to provide the input electrical non-return-to-zero signal.

14. The system of claim 1 wherein each of the first coded signal, the first delayed signal, the first processed signal, the second processed signal, the first driving signal, and the second driving signal is an electrical signal.

15. The system of claim 1 wherein:
the first driving signal is proportional to the first processed signal;
the second driving signal is proportional to the second processed signal.

16. The system of claim 1 wherein the light source is a laser.

17. The system of claim 1 wherein the electro-optical modulator is a Mach-Zehnder modulator.

18. A system for processing one or more signals, the system comprising:
a first time delay device configured to receive a first input signal and generate a first delayed signal, the first delayed signal being delayed with respect to the first input signal by a first predetermined period of time;
a second time delay device configured to receive a second input signal and generate a second delayed signal, the second delayed signal being delayed with respect to the second input signal by a second predetermined period of time;
a first amplifier configured to:
receive the first input signal and the first delayed signal;
determine a first difference between the first input signal and the first delayed signal;
process information associated with the first difference;
generate a first output signal based on at least information associated with the first difference;
a second amplifier configured to:
receive the second input signal and the second delayed signal;
determine a second difference between the second input signal and the second delayed signal;
process information associated with the second difference;
generate a second output signal based on at least information associated with the second difference.

19. The system of claim 18 wherein the first predetermined period of time and the second predetermined period of time are the same.

20. The system of claim 18 wherein the first output signal is at a first logic level if the first difference is larger than a predetermined threshold.

21. The system of claim 20 wherein:
the first output signal is at a second logic level if the first difference is equal to or smaller than the predetermined threshold;
the first logic level and the second logic level are different.

22. The system of claim 21 wherein:
the first logic level is a logic high level;
the second logic level is a logic low level.

23. A system for coding and processing one or more signals, the system comprising:
a demultiplexer configured to receive an input signal and generate a first plurality of signals;
a plurality of XOR gates configured to receive a second plurality of signals related to the first plurality of signals and generate a third plurality of signals based on at least information associated with the second plurality of signals;
a plurality of inverters configured to receive the third plurality of signals and generate a fourth plurality of signals based on at least information associated with the third plurality of signals;
a first plurality of AND gates configured to receive the third plurality of signals and the fourth plurality of signals and generate a fifth plurality of signals;
a second plurality of AND gates configured to receive the third plurality of signals and the fourth plurality of signals and generate a sixth plurality of signals;
a first multiplexer configured to receive the fifth plurality of signals and generate a first output signal;
a second multiplexer configured to receive the sixth plurality of signals and generate a second output signal.

24. The system of claim 23 wherein the first output signal and the second output signal are different.

* * * * *

UNITED STATES PATENT AND TRADEMARK OFFICE
CERTIFICATE OF CORRECTION

| | | |
|---|---|---|
| PATENT NO. | : 7,792,433 B2 | Page 1 of 1 |
| APPLICATION NO. | : 11/373845 | |
| DATED | : September 7, 2010 | |
| INVENTOR(S) | : Yu Sheng Bai | |

It is certified that error appears in the above-identified patent and that said Letters Patent is hereby corrected as shown below:

Column 12, line 27, delete "822_n" and insert -- 522_n --.

Column 14, line 29, delete "At" and insert -- $\Delta t$ --.

Signed and Sealed this

Seventeenth Day of May, 2011

David J. Kappos
*Director of the United States Patent and Trademark Office*